US012398348B2

(12) United States Patent
Smets et al.

(10) Patent No.: US 12,398,348 B2
(45) Date of Patent: Aug. 26, 2025

(54) CONSUMER PRODUCT COMPOSITIONS COMPRISING A POPULATION OF ENCAPSULATES

(71) Applicant: The Procter & Gamble Company, Cincinnati, OH (US)

(72) Inventors: Johan Smets, Lubbeek (BE); An Pintens, Brasschaat (BE); Raul Rodrigo-Gomez, Brussels (BE); Joana Andreia Lameiras Domingues, Brussels (BE); Fadi Selim Chakar, Neenah, WI (US); Linsheng Feng, Menasha, WI (US); Presley Genevie Neuman, Appleton, WI (US); Robert Stanley Bobnock, Menasha, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 545 days.

(21) Appl. No.: 17/500,974

(22) Filed: Oct. 14, 2021

(65) Prior Publication Data

US 2022/0119741 A1 Apr. 21, 2022

Related U.S. Application Data

(60) Provisional application No. 63/092,524, filed on Oct. 16, 2020.

(51) Int. Cl.

*C11D 3/50* (2006.01)
*C11D 3/37* (2006.01)
*C11D 17/00* (2006.01)

(52) U.S. Cl.

CPC ........ *C11D 17/0039* (2013.01); *C11D 3/3761* (2013.01); *C11D 3/505* (2013.01); *C11D 2111/12* (2024.01)

(58) Field of Classification Search

None
See application file for complete search history.

(56) References Cited

U.S. PATENT DOCUMENTS 2,396,278 A 3/1946 Otto
2,438,091 A 3/1948 Lynch
2,486,921 A 11/1949 Byerly
2,486,922 A 11/1949 Bruce
2,528,378 A 10/1950 McCabe, Jr.
2,658,072 A 11/1953 Milton
2,730,456 A 1/1956 Green
2,730,457 A 1/1956 Green
2,800,457 A 7/1957 Green
2,800,458 A 7/1957 Green
2,809,971 A 10/1957 Jack
2,826,551 A 3/1958 Geen
RE24,899 E 11/1960 Green
3,049,509 A 8/1962 Hardy et al.
3,236,733 A 2/1966 Karsten
3,332,880 A 7/1967 Adriaan
3,429,827 A 2/1969 Ruus
3,516,941 A 6/1970 Matson
3,660,304 A 5/1972 Matsukawa
3,681,248 A 8/1972 Gould
3,691,140 A 9/1972 Silver
3,753,196 A 8/1973 Kurtz
3,761,418 A 9/1973 Parran
3,772,215 A 11/1973 Gould
3,826,756 A 7/1974 Bachmann
3,886,085 A 5/1975 Kiritani
3,898,039 A 8/1975 Lin
3,920,819 A 11/1975 Stephens
3,929,678 A 12/1975 Laughlin et al.
3,958,581 A 5/1976 Abegg
3,962,418 A 6/1976 Birkofer
3,964,500 A 6/1976 Drakoff
3,965,033 A 6/1976 Matsukawa
4,001,140 A 1/1977 Foris
4,046,750 A 9/1977 Rembaum
4,062,799 A 12/1977 Matsukawa
4,075,134 A 2/1978 Morehouse, Jr.
4,081,376 A 3/1978 Strub
4,087,376 A 5/1978 Foris
4,089,802 A 5/1978 Foris
4,093,556 A 6/1978 Wojciak
4,100,103 A 7/1978 Foris (Continued)

FOREIGN PATENT DOCUMENTS

AU 2616292 A 4/1993
CN 101088567 A 12/2007

(Continued)

OTHER PUBLICATIONS

PCT Search Report and Written Opinion for PCT/US2021/071854 dated Mar. 14, 2022,21 pages.
"Aluminum Silicate Powder from READE", retrieved on Jul. 23, 2014, pp. 1-2.
All Office Actions; U.S. Appl. No. 17/500,975, filed on Oct. 14, 2021.
All Office Actions; U.S. Appl. No. 17/500,978, filed on Oct. 14, 2021.
Brunauer, et al., "Absorption of Gases in Multimolecular Layers", Journal of the American Chemical Society, vol. 60, 1938, pp. 309-319.
Cayer, "Polymer-based Functional Particulates: Design, Syntheses and Applications", Nov. 11, 2014, XP 055249238, 44pgs.
Celvol Polyvinyl Alcohol . . . A Versatile High-Performance Polymer, Internet Citation, Jan. 1, 2007, pp. 1-16, XP002632184, Retrieved from the Internet: URL: http://www.celanese.com/celvol_polyvinyl_alcohol.pdf [retrieved on Apr. 8, 2011] the whole document.

(Continued)

*Primary Examiner* — Lorna M Douyon
(74) *Attorney, Agent, or Firm* — Carolyn S. Powell

(57) ABSTRACT

Consumer product compositions, such as fabric care compositions, that include a treatment adjunct and a population of encapsulates, where the encapsulates comprise a core and a shell surrounding the core, where the shell comprises an acrylate material, where the core includes a benefit agent, and where the population is characterized by a core-shell weight ratio of equal to or greater than 95:5. Related methods of using and making such compositions.

20 Claims, 1 Drawing Sheet

(56) References Cited

U.S. PATENT DOCUMENTS

| | | | |
|---|---|---|---|
| 4,105,823 | A | 8/1978 | Hasler |
| 4,145,184 | A | 3/1979 | Brain |
| 4,166,152 | A | 8/1979 | Baker |
| 4,183,911 | A | 1/1980 | Smithies |
| 4,197,346 | A | 4/1980 | Stevens |
| 4,197,865 | A | 4/1980 | Jacquet |
| 4,217,914 | A | 8/1980 | Jacquet |
| 4,221,710 | A | 9/1980 | Hoshi |
| 4,234,627 | A | 11/1980 | Schilling |
| 4,240,450 | A | 12/1980 | Cauwet |
| 4,247,411 | A | 1/1981 | Vanlerberghe |
| 4,251,386 | A | 2/1981 | Saeki |
| 4,254,201 | A | 3/1981 | Sawai et al. |
| 4,275,055 | A | 6/1981 | Nachtigal |
| 4,285,720 | A | 8/1981 | Scher |
| 4,323,683 | A | 4/1982 | Bolich, Jr. |
| 4,345,080 | A | 8/1982 | Bolich, Jr. |
| 4,356,109 | A | 10/1982 | Saeki |
| 4,364,837 | A | 12/1982 | Pader |
| 4,379,753 | A | 4/1983 | Bolich, Jr. |
| 4,381,919 | A | 5/1983 | Jacquet |
| 4,422,853 | A | 12/1983 | Jacquet |
| 4,423,099 | A | 12/1983 | Mueller |
| 4,428,869 | A | 1/1984 | Munteanu |
| 4,430,243 | A | 2/1984 | Bragg |
| 4,444,699 | A | 4/1984 | Hayford |
| 4,446,032 | A | 5/1984 | Munteanu |
| 4,450,123 | A | 5/1984 | Egawa |
| 4,470,982 | A | 9/1984 | Winkler |
| 4,507,280 | A | 3/1985 | Pohl |
| 4,515,705 | A | 5/1985 | Moeddel |
| 4,529,586 | A | 7/1985 | De Marco et al. |
| 4,537,706 | A | 8/1985 | Severson, Jr. |
| 4,537,707 | A | 8/1985 | Severson, Jr. |
| 4,547,429 | A | 10/1985 | Greiner |
| 4,550,862 | A | 11/1985 | Barker |
| 4,552,811 | A | 11/1985 | Brown |
| 4,561,997 | A | 12/1985 | Roehl |
| 4,561,998 | A | 12/1985 | Wertz |
| 4,574,110 | A | 3/1986 | Asano |
| 4,588,639 | A | 5/1986 | Ozono |
| 4,597,898 | A | 7/1986 | Vander |
| 4,601,863 | A | 7/1986 | Shioi |
| 4,608,250 | A | 8/1986 | Jacquet |
| 4,610,927 | A | 9/1986 | Igarashi |
| 4,622,267 | A | 11/1986 | Riecke |
| 4,626,372 | A | 12/1986 | Kaufmann et al. |
| 4,663,158 | A | 5/1987 | Wolfram |
| 4,687,808 | A | 8/1987 | Jarrett et al. |
| 4,708,924 | A | 11/1987 | Nagai |
| 4,719,099 | A | 1/1988 | Grollier |
| 4,722,865 | A | 2/1988 | Huizer |
| 4,741,855 | A | 5/1988 | Grote |
| 4,746,467 | A | 5/1988 | Sakamoto |
| 4,754,110 | A | 6/1988 | Craft |
| 4,775,656 | A | 10/1988 | Harada |
| 4,780,370 | A | 10/1988 | Pointier |
| 4,798,691 | A | 1/1989 | Kasai |
| 4,803,947 | A | 2/1989 | Ueki |
| 4,824,707 | A | 4/1989 | Spector |
| 4,863,626 | A | 9/1989 | Coyne |
| 4,865,759 | A | 9/1989 | Coyne |
| 4,882,220 | A | 11/1989 | Ono |
| 4,908,271 | A | 3/1990 | Kasai |
| 4,911,851 | A | 3/1990 | Ladd, Jr. |
| 4,917,920 | A | 4/1990 | Ono |
| 4,919,841 | A | 4/1990 | Kamel |
| 4,946,624 | A | 8/1990 | Michael |
| 4,957,666 | A | 9/1990 | Kawamura |
| 4,968,451 | A | 11/1990 | Scheibel |
| 4,972,000 | A | 11/1990 | Kawashima |
| 5,009,880 | A | 4/1991 | Grollier |
| 5,061,410 | A | 10/1991 | Sakamoto |
| 5,066,419 | A | 11/1991 | Walley |
| 5,071,706 | A | 12/1991 | Soper |
| 5,104,646 | A | 4/1992 | Bolich, Jr. |
| 5,105,823 | A | 4/1992 | Blum |
| 5,106,609 | A | 4/1992 | Bolich, Jr. |
| 5,113,585 | A | 5/1992 | Rogers |
| 5,118,756 | A | 6/1992 | Asano |
| 5,120,349 | A | 6/1992 | Stewart |
| 5,137,646 | A | 8/1992 | Schmidt et al. |
| 5,145,675 | A | 9/1992 | Won |
| 5,176,903 | A | 1/1993 | Goldberg |
| 5,185,155 | A | 2/1993 | Behan |
| 5,188,753 | A | 2/1993 | Schmidt |
| 5,225,278 | A | 7/1993 | Kielbania, Jr. |
| 5,230,822 | A | 7/1993 | Kamel et al. |
| 5,232,613 | A | 8/1993 | Bacon |
| 5,232,769 | A | 8/1993 | Yamato |
| 5,234,611 | A | 8/1993 | Trinh |
| 5,234,682 | A | 8/1993 | Macchio |
| 5,277,979 | A | 1/1994 | Kielbania, Jr. |
| 5,278,106 | A | 1/1994 | Nakashima |
| 5,281,355 | A | 1/1994 | Tsaur et al. |
| 5,292,835 | A | 3/1994 | Jahns |
| RE34,584 | E | 4/1994 | Grote |
| 5,324,444 | A | 6/1994 | Berry |
| 5,324,445 | A | 6/1994 | Langley et al. |
| 5,342,556 | A | 8/1994 | Traeubel |
| 5,362,565 | A | 11/1994 | Murano |
| 5,366,652 | A | 11/1994 | Capeci |
| 5,370,881 | A | 12/1994 | Fuisz |
| 5,380,756 | A | 1/1995 | Andrews |
| 5,399,192 | A | 3/1995 | Yamasoe |
| 5,407,609 | A | 4/1995 | Tice |
| 5,468,473 | A | 11/1995 | Mullen |
| 5,486,303 | A | 1/1996 | Capeci |
| 5,487,884 | A | 1/1996 | Bissett |
| 5,489,392 | A | 2/1996 | Capeci |
| 5,516,448 | A | 5/1996 | Capeci |
| 5,565,145 | A | 10/1996 | Watson |
| 5,565,422 | A | 10/1996 | Del |
| 5,569,645 | A | 10/1996 | Dinniwell |
| 5,573,756 | A | 11/1996 | Lambrechts |
| 5,574,005 | A | 11/1996 | Welch |
| 5,575,282 | A | 11/1996 | Knoch |
| 5,576,282 | A | 11/1996 | Miracle |
| 5,580,578 | A | 12/1996 | Oshlack |
| 5,595,967 | A | 1/1997 | Miracle |
| 5,596,051 | A | 1/1997 | Jahns |
| 5,597,936 | A | 1/1997 | Perkins |
| 5,607,980 | A | 3/1997 | Mcatee |
| 5,611,972 | A | 3/1997 | Tararuj |
| 5,637,401 | A | 6/1997 | Berman |
| 5,648,328 | A | 7/1997 | Angell |
| 5,652,228 | A | 7/1997 | Bissett |
| 5,656,584 | A | 8/1997 | Angell |
| 5,674,478 | A | 10/1997 | Dodd |
| 5,681,852 | A | 10/1997 | Bissett |
| 5,691,297 | A | 11/1997 | Nassano |
| 5,702,714 | A | 12/1997 | Goss |
| 5,716,938 | A | 2/1998 | Provitt |
| 5,723,420 | A | 3/1998 | Wei |
| 5,725,869 | A | 3/1998 | Lo |
| 5,750,122 | A | 5/1998 | Evans |
| 5,756,436 | A | 5/1998 | Royce |
| 5,759,573 | A | 6/1998 | Kim |
| 5,782,409 | A | 7/1998 | Paul |
| 5,783,536 | A | 7/1998 | Farrell |
| 5,800,805 | A | 9/1998 | Salas |
| 5,807,956 | A | 9/1998 | Czech |
| 5,827,538 | A | 10/1998 | Cussler |
| 5,833,971 | A | 11/1998 | Baldwin |
| 5,856,409 | A | 1/1999 | Ziemelis |
| 5,876,755 | A | 3/1999 | Perring |
| 5,879,584 | A | 3/1999 | Bianchetti |
| 5,885,701 | A | 3/1999 | Berman |
| 5,929,022 | A | 7/1999 | Velazquez |
| 5,945,085 | A | 8/1999 | Salas |
| 5,962,018 | A | 10/1999 | Curtis |
| 5,972,859 | A | 10/1999 | Farrell |
| 5,981,681 | A | 11/1999 | Czech |
| 6,024,943 | A | 2/2000 | Ness |

(56) References Cited

U.S. PATENT DOCUMENTS

| | | | |
|---|---|---|---|
| D424,745 | S | 5/2000 | Tseng |
| 6,075,003 | A | 6/2000 | Haq |
| 6,147,037 | A | 11/2000 | Gardlik |
| 6,159,485 | A | 12/2000 | Yu |
| 6,182,365 | B1 | 2/2001 | Tseng |
| 6,185,822 | B1 | 2/2001 | Tseng |
| 6,194,375 | B1 | 2/2001 | Ness |
| 6,207,782 | B1 | 3/2001 | Czech |
| 6,221,326 | B1 | 4/2001 | Amiche |
| 6,221,826 | B1 | 4/2001 | Surutzidis |
| 6,225,464 | B1 | 5/2001 | Hiler |
| 6,228,398 | B1 | 5/2001 | Devane |
| 6,235,274 | B1 | 5/2001 | Lou |
| 6,235,773 | B1 | 5/2001 | Bissett |
| 6,245,366 | B1 | 6/2001 | Popplewell |
| 6,245,733 | B1 | 6/2001 | Mosbaugh |
| 6,248,364 | B1 | 6/2001 | Sengupta |
| 6,258,857 | B1 | 7/2001 | Iijima |
| 6,261,483 | B1 | 7/2001 | Frank |
| 6,294,514 | B1 | 9/2001 | Welling |
| 6,298,558 | B1 | 10/2001 | Tseng |
| 6,306,812 | B1 | 10/2001 | Perkins |
| 6,325,995 | B1 | 12/2001 | El-Nokaly |
| 6,326,348 | B1 | 12/2001 | Vinson |
| 6,329,057 | B1 | 12/2001 | Dungworth |
| 6,348,218 | B1 | 2/2002 | Hed |
| 6,355,263 | B1 | 3/2002 | Shuku et al. |
| 6,362,159 | B1 | 3/2002 | Aguadisch |
| 6,368,633 | B1 | 4/2002 | Lou |
| 6,375,872 | B1 | 4/2002 | Chao |
| 6,375,983 | B1 | 4/2002 | Kantor |
| 6,376,445 | B1 | 4/2002 | Bettiol |
| 6,399,192 | B1 | 6/2002 | Pinna |
| 6,413,548 | B1 | 7/2002 | Hamer |
| 6,428,796 | B1 | 8/2002 | Gers-Barlag |
| 6,451,754 | B1 | 9/2002 | Rowland |
| 6,482,969 | B1 | 11/2002 | Helmrick |
| 6,489,047 | B2 | 12/2002 | Mosbaugh |
| 6,498,135 | B1 | 12/2002 | Angell |
| 6,503,495 | B1 | 1/2003 | Alwattari |
| 6,524,564 | B1 | 2/2003 | Kim |
| 6,531,156 | B1 | 3/2003 | Clark |
| 6,550,092 | B1 | 4/2003 | Brown |
| 6,558,706 | B2 | 5/2003 | Kantor |
| 6,592,990 | B2 | 7/2003 | Schwantes |
| 6,594,904 | B1 | 7/2003 | Tseng |
| 6,607,717 | B1 | 8/2003 | Johnson |
| 6,608,017 | B1 | 8/2003 | Dihora |
| 6,638,591 | B2 | 10/2003 | Bowen |
| 6,670,311 | B1 | 12/2003 | Aldcroft |
| 6,682,749 | B1 | 1/2004 | Potechin |
| 6,696,049 | B2 | 2/2004 | Vatter |
| 6,696,400 | B2 | 2/2004 | Puelle |
| 6,703,032 | B2 | 3/2004 | Gers-Barlag |
| 6,730,325 | B2 | 5/2004 | Devane |
| 6,733,790 | B1 | 5/2004 | Garces |
| 6,767,880 | B1 | 7/2004 | Foley |
| 6,769,271 | B2 | 8/2004 | Mosbaugh |
| 6,770,293 | B2 | 8/2004 | Angel |
| 6,780,507 | B2 | 8/2004 | Toreki |
| 6,783,770 | B2 | 8/2004 | Angel |
| 6,790,814 | B1 | 9/2004 | Marin |
| 6,793,936 | B2 | 9/2004 | Devane |
| 6,797,683 | B2 | 9/2004 | Shana |
| 6,800,598 | B1 | 10/2004 | Waeschenbach |
| 6,806,249 | B2 | 10/2004 | Yang |
| 6,838,087 | B1 | 1/2005 | Day |
| 6,846,785 | B2 | 1/2005 | Patel |
| 6,849,584 | B2 | 2/2005 | Geary |
| 6,849,591 | B1 | 2/2005 | Boeckh |
| 6,864,223 | B2 | 3/2005 | Smith |
| 6,869,923 | B1 | 3/2005 | Cunningham |
| 6,872,696 | B2 | 3/2005 | Becker et al. |
| 6,872,853 | B1 | 3/2005 | Van Der Schaaf |
| 6,881,482 | B2 | 4/2005 | Vasisht |
| 6,902,742 | B2 | 6/2005 | Devane |
| 6,916,481 | B1 | 7/2005 | Prud |
| 6,939,992 | B2 | 9/2005 | Van Der Schaaf |
| 6,944,952 | B1 | 9/2005 | Tseng |
| 6,949,498 | B2 | 9/2005 | Murphy et al. |
| 6,951,836 | B2 | 10/2005 | Jahns |
| 6,955,823 | B2 | 10/2005 | Casson |
| 6,958,313 | B2 | 10/2005 | Caswell |
| 6,982,256 | B2 | 1/2006 | Votteler |
| 7,015,186 | B2 | 3/2006 | Aussant |
| 7,041,767 | B2 | 5/2006 | Lange |
| 7,053,034 | B2 | 5/2006 | Shefer |
| 7,069,658 | B2 | 7/2006 | Tseng |
| 7,105,064 | B2 | 9/2006 | Popplewell |
| 7,119,057 | B2 | 10/2006 | Popplewell |
| 7,122,512 | B2 | 10/2006 | Brain |
| 7,125,835 | B2 | 10/2006 | Bennett |
| 7,137,570 | B2 | 11/2006 | Wheatley |
| 7,159,792 | B2 | 1/2007 | Wheatley |
| 7,169,741 | B2 | 1/2007 | Barry et al. |
| 7,186,679 | B2 | 3/2007 | Shepherd, Jr. |
| 7,186,680 | B2 | 3/2007 | Caswell |
| 7,192,599 | B2 | 3/2007 | Mercier |
| 7,196,049 | B2 | 3/2007 | Brain |
| 7,204,998 | B2 | 4/2007 | Holzner |
| 7,208,463 | B2 | 4/2007 | Heltovics |
| 7,208,465 | B2 | 4/2007 | Heltovics |
| 7,211,273 | B2 | 5/2007 | Hsu |
| 7,211,556 | B2 | 5/2007 | Heibel |
| 7,217,777 | B2 | 5/2007 | Lange |
| 7,226,607 | B2 | 6/2007 | Uchiyama |
| 7,229,611 | B2 | 6/2007 | Zamudio-tena |
| 7,235,261 | B2 | 6/2007 | Smith |
| 7,241,835 | B2 | 7/2007 | Obrien |
| 7,247,374 | B2 | 7/2007 | Haggquist |
| 7,270,828 | B2 | 9/2007 | Masuda |
| 7,279,542 | B2 | 10/2007 | Ouali |
| 7,293,719 | B2 | 11/2007 | Wheatley |
| 7,294,612 | B2 | 11/2007 | Popplewell |
| 7,311,900 | B2 | 12/2007 | Conover |
| 7,338,928 | B2 | 3/2008 | Lau |
| 7,375,875 | B2 | 5/2008 | Whitesides |
| 7,381,417 | B2 | 6/2008 | Gamez-Garcia |
| 7,399,324 | B2 | 7/2008 | Roddenbery |
| 7,407,650 | B2 | 8/2008 | Heltovics |
| 7,413,731 | B2 | 8/2008 | Heltovics |
| 7,442,838 | B2 | 10/2008 | Van Der Schaaf |
| 7,452,547 | B2 | 11/2008 | Lambino |
| 7,465,439 | B2 | 12/2008 | Avery |
| 7,491,687 | B2 | 2/2009 | Popplewell |
| 7,521,124 | B2 | 4/2009 | Ahn |
| 7,524,807 | B2 | 4/2009 | Clapp |
| 7,532,388 | B2 | 5/2009 | Whitesides |
| 7,538,077 | B2 | 5/2009 | Sichmann |
| 7,538,078 | B2 | 5/2009 | Holzner |
| 7,569,528 | B2 | 8/2009 | Lant |
| 7,575,633 | B2 | 8/2009 | Romanin |
| 7,575,804 | B2 | 8/2009 | Lang-wittkowski |
| 7,585,824 | B2 | 9/2009 | Popplewell |
| 7,585,825 | B2 | 9/2009 | Artiga |
| 7,585,832 | B2 | 9/2009 | Smith |
| 7,736,695 | B2 | 6/2010 | Schwantes |
| 7,772,175 | B2 | 8/2010 | Panandiker |
| 7,794,836 | B2 | 9/2010 | Vasishtha |
| 7,799,421 | B2 | 9/2010 | Goodson |
| 7,799,752 | B2 | 9/2010 | Ness |
| 7,803,422 | B2 | 9/2010 | Schwantes |
| 7,833,960 | B2 | 11/2010 | Lei |
| 7,871,588 | B2 | 1/2011 | Lindner |
| 7,932,191 | B2 | 4/2011 | Dungworth et al. |
| 7,968,510 | B2 | 6/2011 | Smets et al. |
| 7,985,445 | B2 | 7/2011 | Schwantes |
| 7,998,494 | B2 | 8/2011 | Holzner |
| 8,022,029 | B2 | 9/2011 | Broze |
| 8,026,205 | B2 | 9/2011 | Broze |
| 8,053,405 | B2 | 11/2011 | Narayanan |
| 8,067,089 | B2 | 11/2011 | Schwantes |
| 8,071,214 | B2 | 12/2011 | Schwantes |
| 8,093,201 | B2 | 1/2012 | Broze |

(56) References Cited

U.S. PATENT DOCUMENTS 8,110,284 B2 2/2012 Naigertsik
8,119,163 B2 2/2012 Devane
8,129,327 B2 3/2012 Zhang
8,147,808 B2 4/2012 Scavone
8,158,571 B2 4/2012 Alonso
8,163,207 B2 4/2012 Jung
8,192,838 B2 6/2012 Goodson
8,206,820 B2 6/2012 Bogaerts
8,242,069 B2 8/2012 Struillou
8,246,869 B2 8/2012 Stowell
8,252,356 B2 8/2012 Ogura
8,304,075 B2 11/2012 Lang-Wittkowski
8,329,154 B2 12/2012 Uchiyama
8,349,300 B2 1/2013 Wells
8,354,369 B2 1/2013 Beaussoubre
8,426,194 B2 4/2013 Cao
8,455,098 B2 6/2013 Schwantes
8,460,791 B2 6/2013 Hentze
8,460,864 B2 6/2013 Cao
8,470,762 B2 6/2013 Broze
8,551,935 B2 10/2013 Smets
8,784,984 B2 7/2014 Grey
8,853,142 B2 10/2014 Corominas et al.
RE45,538 E 6/2015 Smets
9,162,085 B2 10/2015 Dihora et al.
9,186,642 B2 11/2015 Dihora
9,221,028 B2 12/2015 Dihora
9,415,530 B2 8/2016 Fukuda
9,579,676 B1 2/2017 Burrowes
9,885,009 B2 2/2018 Brundel et al.
9,890,351 B2 2/2018 Smets
9,895,297 B2 2/2018 Ribaut
9,993,793 B2 6/2018 Dihora
10,059,907 B2 8/2018 Ribaut
10,308,894 B2 6/2019 Feng
10,385,297 B2 8/2019 Song et al.
10,920,177 B2 2/2021 Smets et al.
2002/0010123 A1 1/2002 Schmiedel et al.
2002/0016269 A1 2/2002 Noda
2002/0102286 A1 8/2002 Kantor
2002/0136773 A1 9/2002 Scher
2002/0169233 A1 11/2002 Schwantes
2003/0017126 A1 1/2003 Mahadeshwar
2003/0017959 A1 1/2003 Baeck
2003/0024997 A1 2/2003 Welch
2003/0031722 A1 2/2003 Cao
2003/0073607 A1 4/2003 Smets
2003/0077378 A1 4/2003 Lou
2003/0108501 A1 6/2003 Hofrichter
2003/0109391 A1 6/2003 Midha
2003/0125222 A1 7/2003 Jahns
2003/0139312 A1 7/2003 Caswell
2003/0152542 A1 8/2003 Decoster
2003/0170304 A1 9/2003 Devane
2003/0194416 A1 10/2003 Shefer
2003/0199412 A1 10/2003 Gupta
2003/0203978 A1 10/2003 Obrien
2003/0215417 A1 11/2003 Uchiyama
2003/0216488 A1 11/2003 Uchiyama
2003/0220220 A1 11/2003 Bach
2004/0013737 A1 1/2004 Becourt
2004/0043078 A1 3/2004 Herault
2004/0071742 A1 4/2004 Popplewell
2004/0087470 A1 5/2004 Grandmaire
2004/0091445 A1 5/2004 Dykstra
2004/0092425 A1 5/2004 Boutique et al.
2004/0101577 A1 5/2004 Ahn
2004/0109920 A1 6/2004 Reuscher
2004/0110898 A1 6/2004 Dreja
2004/0137028 A1 7/2004 de la Poterie
2004/0138088 A1 7/2004 Pereira
2004/0175347 A1 9/2004 Bissett
2004/0175404 A1 9/2004 Shefer
2004/0197405 A1 10/2004 Devane
2004/0208902 A1 10/2004 Gupta
2004/0214742 A1 10/2004 Meli
2004/0220062 A1 11/2004 Pereira
2004/0229769 A1 11/2004 Smith
2004/0251569 A1 12/2004 Matsubara
2004/0267182 A1 12/2004 Davis et al.
2005/0014674 A1 1/2005 Liechty
2005/0026801 A1 2/2005 Broeckx et al.
2005/0038188 A1 2/2005 Ahn
2005/0043209 A1 2/2005 Schmiedel
2005/0048549 A1 3/2005 Cao
2005/0089540 A1 4/2005 Uchiyama
2005/0112152 A1 5/2005 Popplewell
2005/0113282 A1 5/2005 Parekh
2005/0119351 A1 6/2005 Van Der Schaaf
2005/0129759 A1 6/2005 Sojka
2005/0169793 A1 8/2005 Wheatley
2005/0215457 A1 9/2005 Becks et al.
2005/0226900 A1 10/2005 Winton
2005/0227907 A1 10/2005 Lee
2005/0276831 A1 12/2005 Dihora
2006/0008646 A1 1/2006 Haggquist
2006/0099168 A1 5/2006 Corzani
2006/0116304 A1 6/2006 Mcritchie
2006/0127430 A1 6/2006 Gupta
2006/0134154 A1 6/2006 Giles
2006/0160711 A1 7/2006 Frank
2006/0165740 A1 7/2006 Frank
2006/0166855 A1 7/2006 Murad
2006/0217288 A1 9/2006 Wahl
2006/0240105 A1 10/2006 Devane
2006/0248665 A1 11/2006 Pluyter
2006/0258557 A1 11/2006 Popplewell
2006/0263311 A1 11/2006 Scavone
2006/0263312 A1 11/2006 Scavone
2006/0263313 A1 11/2006 Scavone
2006/0263518 A1 11/2006 Schwantes
2006/0263519 A1 11/2006 Schwantes
2006/0263898 A1 11/2006 Paget
2006/0275237 A1 12/2006 Bissett
2006/0292098 A1 12/2006 Scavone
2007/0020205 A1 1/2007 Blin
2007/0031463 A1 2/2007 Fotinos
2007/0041929 A1 2/2007 Torgerson
2007/0048339 A1 3/2007 Popplewell
2007/0071781 A1 3/2007 Louys
2007/0071978 A1 3/2007 Sojka
2007/0078071 A1 4/2007 Lee
2007/0122481 A1 5/2007 Liversidge
2007/0123442 A1 5/2007 Holzner
2007/0134411 A1 6/2007 Cont
2007/0136328 A1 6/2007 Carro
2007/0138671 A1 6/2007 Anastasiou
2007/0138672 A1 6/2007 Lee
2007/0138673 A1 6/2007 Lee
2007/0138674 A1 6/2007 Anastasiou
2007/0160561 A1 7/2007 Ouali
2007/0160675 A1 7/2007 Devane
2007/0173433 A1 7/2007 Heibel
2007/0202063 A1 8/2007 Dihora
2007/0207109 A1 9/2007 Peffly
2007/0207174 A1 9/2007 Pluyter
2007/0224274 A1 9/2007 Siol
2007/0224395 A1 9/2007 Rowitsch et al.
2007/0248553 A1 10/2007 Scavone
2007/0286837 A1 12/2007 Torgerson
2007/0286904 A1 12/2007 Popplewell
2007/0292361 A1 12/2007 Virgallito
2007/0298061 A1 12/2007 Boghani
2008/0008750 A1 1/2008 Tochio
2008/0031961 A1 2/2008 Cunningham et al.
2008/0032909 A1 2/2008 de Buzzaccarini
2008/0040082 A1 2/2008 Stanton
2008/0057021 A1 3/2008 Dykstra
2008/0061459 A1 3/2008 Nakajima
2008/0102121 A1 5/2008 Devane
2008/0107615 A1 5/2008 Keene
2008/0113025 A1 5/2008 Devane
2008/0118556 A1 5/2008 Devane
2008/0128941 A1 6/2008 Lopez

(56) References Cited

U.S. PATENT DOCUMENTS

| | | | |
|---|---|---|---|
| 2008/0182774 | A1 | 7/2008 | Naraschkewitz |
| 2008/0187596 | A1 | 8/2008 | Dihora |
| 2008/0199503 | A1 | 8/2008 | Camargo |
| 2008/0200359 | A1 | 8/2008 | Smets |
| 2008/0200363 | A1 | 8/2008 | Smets |
| 2008/0213451 | A1 | 9/2008 | Ogura |
| 2008/0226684 | A1 | 9/2008 | Peppas |
| 2008/0234406 | A1 | 9/2008 | Rawlins |
| 2008/0305982 | A1 | 12/2008 | Smets |
| 2008/0311064 | A1 | 12/2008 | Lei |
| 2008/0317788 | A1 | 12/2008 | Louzan |
| 2008/0318788 | A1 | 12/2008 | Nadian |
| 2009/0010864 | A1 | 1/2009 | Banowski et al. |
| 2009/0022764 | A1 | 1/2009 | Frater |
| 2009/0023189 | A1 | 1/2009 | Lau |
| 2009/0029900 | A1 | 1/2009 | Cetti |
| 2009/0035365 | A1 | 2/2009 | Popplewell |
| 2009/0047434 | A1 | 2/2009 | Trophardy |
| 2009/0053165 | A1 | 2/2009 | Brown |
| 2009/0081265 | A1 | 3/2009 | Peppas |
| 2009/0118399 | A1 | 5/2009 | Benbakoura |
| 2009/0120526 | A1 | 5/2009 | Berktold |
| 2009/0142444 | A1 | 6/2009 | Jarrard, Jr. |
| 2009/0149479 | A1 | 6/2009 | Jenkins |
| 2009/0202465 | A1 | 8/2009 | Mougin |
| 2009/0209661 | A1 | 8/2009 | Somerville |
| 2009/0221463 | A1 | 9/2009 | Kitko |
| 2009/0226529 | A1 | 9/2009 | Quellet et al. |
| 2009/0232857 | A1 | 9/2009 | Peppas |
| 2009/0232858 | A1 | 9/2009 | Peppas |
| 2009/0247449 | A1 | 10/2009 | Burdis |
| 2009/0252789 | A1 | 10/2009 | Trophardy |
| 2009/0258042 | A1 | 10/2009 | Anastasiou |
| 2009/0258812 | A1 | 10/2009 | Sengupta |
| 2009/0274905 | A1 | 11/2009 | Schwantes |
| 2009/0274906 | A1 | 11/2009 | Schwantes |
| 2009/0274907 | A1 | 11/2009 | Schwantes |
| 2009/0275494 | A1 | 11/2009 | Ferguson |
| 2009/0289216 | A1 | 11/2009 | Jung |
| 2009/0324660 | A1 | 12/2009 | Cetti |
| 2010/0003518 | A1 | 1/2010 | Grey |
| 2010/0029537 | A1 | 2/2010 | Dihora et al. |
| 2010/0040884 | A1 | 2/2010 | Smets |
| 2010/0056414 | A1 | 3/2010 | Smith |
| 2010/0061954 | A1 | 3/2010 | Adams |
| 2010/0068163 | A1 | 3/2010 | Lu |
| 2010/0068525 | A1 | 3/2010 | Willax |
| 2010/0104611 | A1 | 4/2010 | Chan |
| 2010/0104612 | A1 | 4/2010 | Cropper |
| 2010/0104613 | A1 | 4/2010 | Chan |
| 2010/0119679 | A1 | 5/2010 | Dihora |
| 2010/0179088 | A1 | 7/2010 | Flachsmann et al. |
| 2010/0190674 | A1 | 7/2010 | Smets et al. |
| 2010/0216684 | A1 | 8/2010 | Ferguson |
| 2010/0275384 | A1 | 11/2010 | Broze |
| 2010/0286018 | A1 | 11/2010 | Hentze |
| 2010/0297446 | A1 | 11/2010 | Oxley |
| 2011/0003152 | A1 | 1/2011 | Grey |
| 2011/0005001 | A1* | 1/2011 | Robles ................. C11D 10/042 510/340 |
| 2011/0008427 | A1 | 1/2011 | Biggs |
| 2011/0008435 | A1 | 1/2011 | Devane |
| 2011/0020416 | A1 | 1/2011 | Pluyter |
| 2011/0021408 | A1 | 1/2011 | Meek et al. |
| 2011/0033513 | A1 | 2/2011 | Lei |
| 2011/0086788 | A1 | 4/2011 | Smets |
| 2011/0093246 | A1 | 4/2011 | Stanton |
| 2011/0104221 | A1 | 5/2011 | Galeone et al. |
| 2011/0110997 | A1 | 5/2011 | Cunningham et al. |
| 2011/0111999 | A1 | 5/2011 | Smets |
| 2011/0152147 | A1 | 6/2011 | Smets |
| 2011/0239377 | A1 | 10/2011 | Fossum et al. |
| 2011/0239378 | A1 | 10/2011 | Fossum et al. |
| 2011/0245139 | A1 | 10/2011 | Koehle et al. |
| 2011/0245140 | A1 | 10/2011 | Demeyere |
| 2011/0245141 | A1 | 10/2011 | Gizaw |
| 2011/0267702 | A1 | 11/2011 | Fujimoto |
| 2011/0268778 | A1 | 11/2011 | Dihora |
| 2011/0268802 | A1 | 11/2011 | Dihora |
| 2011/0269657 | A1 | 11/2011 | Dihora |
| 2011/0269658 | A1 | 11/2011 | Dihora |
| 2011/0294715 | A1 | 12/2011 | Smets |
| 2011/0306116 | A1 | 12/2011 | Jin |
| 2012/0010120 | A1 | 1/2012 | Somerville |
| 2012/0053108 | A1 | 3/2012 | Glenn, Jr. |
| 2012/0071391 | A1 | 3/2012 | Smets |
| 2012/0076839 | A1 | 3/2012 | Chan |
| 2012/0114582 | A1 | 5/2012 | Batchelor |
| 2012/0121677 | A1 | 5/2012 | Franklin |
| 2012/0152268 | A1 | 6/2012 | York |
| 2012/0177924 | A1 | 7/2012 | Jung |
| 2012/0258150 | A1 | 10/2012 | Rauckhorst |
| 2012/0276175 | A1 | 11/2012 | Dihora |
| 2012/0276210 | A1 | 11/2012 | Dihora |
| 2012/0282309 | A1 | 11/2012 | Dihora |
| 2012/0322709 | A1 | 12/2012 | Li |
| 2013/0039962 | A1 | 2/2013 | Smets |
| 2013/0137625 | A1 | 5/2013 | Stowell |
| 2013/0203644 | A1 | 8/2013 | Lant |
| 2013/0245153 | A1 | 9/2013 | Schwantes |
| 2013/0296211 | A1 | 11/2013 | Smets |
| 2013/0302392 | A1 | 11/2013 | Mistry |
| 2014/0037703 | A1 | 2/2014 | Dihora |
| 2014/0079747 | A1 | 3/2014 | Dihora |
| 2014/0079748 | A1 | 3/2014 | Cetti |
| 2014/0086965 | A1 | 3/2014 | Dihora |
| 2014/0127309 | A1 | 5/2014 | Drake |
| 2014/0178442 | A1 | 6/2014 | Li |
| 2014/0227328 | A1 | 8/2014 | Dihora |
| 2014/0338134 | A1 | 11/2014 | Fernandez Prieto et al. |
| 2014/0342964 | A1 | 11/2014 | Jackson et al. |
| 2014/0342972 | A1 | 11/2014 | Smets |
| 2015/0000048 | A1 | 1/2015 | Miracle |
| 2015/0017214 | A1 | 1/2015 | Warr |
| 2015/0071977 | A1 | 3/2015 | Dihora et al. |
| 2015/0086595 | A1 | 3/2015 | Dihora |
| 2015/0132377 | A1 | 5/2015 | Reymar |
| 2015/0284660 | A1 | 10/2015 | Budijono et al. |
| 2015/0352576 | A1 | 12/2015 | Burrowes et al. |
| 2016/0024434 | A1 | 1/2016 | Sivik |
| 2016/0108340 | A1 | 4/2016 | Feng et al. |
| 2016/0128917 | A1* | 5/2016 | Wei ........................ A61K 8/416 510/130 |
| 2016/0168509 | A1 | 6/2016 | Hitchcock et al. |
| 2016/0184196 | A1 | 6/2016 | Baxter |
| 2016/0304817 | A1 | 10/2016 | Fernandez Prieto et al. |
| 2017/0002293 | A1 | 1/2017 | Dihora |
| 2017/0002301 | A1 | 1/2017 | Dihora |
| 2017/0002302 | A1 | 1/2017 | Dihora |
| 2018/0110700 | A1 | 4/2018 | Dihora et al. |
| 2018/0215982 | A1 | 8/2018 | Zhang et al. |
| 2018/0264425 | A1 | 9/2018 | Verstraete et al. |
| 2018/0265811 | A1 | 9/2018 | Fernandez Prieto |
| 2018/0265818 | A1 | 9/2018 | Smets |
| 2018/0265827 | A1 | 9/2018 | Oh |
| 2018/0289597 | A1 | 10/2018 | Baxter |
| 2018/0333341 | A1 | 11/2018 | Nijakowski et al. |
| 2018/0360706 | A1 | 12/2018 | Dihora |
| 2018/0362892 | A1 | 12/2018 | Beckholt |
| 2019/0062676 | A1 | 2/2019 | Ott |
| 2019/0091115 | A1 | 3/2019 | Nijakowski et al. |
| 2019/0142714 | A1 | 5/2019 | Dihora |
| 2020/0002653 | A1 | 1/2020 | Smets |
| 2020/0002654 | A1 | 1/2020 | Smets |
| 2020/0181543 | A1 | 6/2020 | Smets |
| 2020/0222873 | A1 | 7/2020 | Neuman et al. |
| 2020/0283704 | A1 | 9/2020 | Smets |
| 2020/0283705 | A1 | 9/2020 | Smets |
| 2020/0330937 | A1 | 10/2020 | Rodrigo-Gomez et al. |
| 2020/0330951 | A1 | 10/2020 | Rodrigo-Gomez et al. |
| 2020/0330952 | A1 | 10/2020 | Rodrigo-Gomez et al. |
| 2020/0407665 | A1 | 12/2020 | Joos |
| 2021/0252469 | A1 | 8/2021 | Feng |

(56) References Cited

U.S. PATENT DOCUMENTS

| | | | |
|---|---|---|---|
| 2021/0339217 | A1 | 11/2021 | Feng |
| 2022/0151902 | A1 | 5/2022 | Denigot |
| 2023/0159863 | A1 | 5/2023 | Chakar et al. |

FOREIGN PATENT DOCUMENTS

| | | | |
|---|---|---|---|
| DE | 10062585 | A1 | 6/2002 |
| DE | 102006058253 | A1 | 6/2008 |
| DE | 10200803501 | A1 | 1/2010 |
| DE | 102008044700 | A1 | 2/2010 |
| EP | 0523287 | A1 | 1/1993 |
| EP | 0820762 | A1 | 1/1998 |
| EP | 0829259 | A1 | 3/1998 |
| EP | 1034705 | A2 | 9/2000 |
| EP | 1243318 | A1 | 9/2002 |
| EP | 1243320 | A1 | 9/2002 |
| EP | 1247568 | A1 | 10/2002 |
| EP | 1600151 | A1 | 11/2005 |
| EP | 1702674 | A1 | 9/2006 |
| EP | 1850887 | B1 | 7/2008 |
| EP | 2132294 | B1 | 9/2012 |
| EP | 2090284 | B1 | 12/2012 |
| EP | 2620211 | A2 | 7/2013 |
| EP | 2938429 | A1 | 11/2015 |
| EP | 3375858 | A1 | 9/2018 |
| EP | 2433617 | B1 | 5/2019 |
| FR | 2702961 | A1 | 9/1994 |
| FR | 2881048 | A1 | 7/2006 |
| GB | 1451411 | A | 10/1976 |
| GB | 1478788 | A | 7/1977 |
| GB | 1546480 | A | 5/1979 |
| GB | 2062570 | A | 5/1981 |
| GB | 2217603 | A | 11/1989 |
| GB | 2274989 | B | 3/1997 |
| GB | 2334724 | A | 9/1999 |
| JP | S545051 | A | 1/1979 |
| JP | S5819261 | A | 2/1983 |
| JP | 59139268 | A | 8/1984 |
| JP | 61244366 | A | 10/1986 |
| JP | 62116506 | A | 5/1987 |
| JP | 01256965 | A | 10/1989 |
| JP | 02052661 | A | 2/1990 |
| JP | H0236803 | A | 2/1990 |
| JP | 04021513 | A | 1/1992 |
| JP | 04082558 | A | 3/1992 |
| JP | 04156851 | A | 5/1992 |
| JP | 05017338 | A | 1/1993 |
| JP | 06000361 | A | 1/1994 |
| JP | H0641576 | U | 6/1994 |
| JP | 07075666 | A | 3/1995 |
| JP | 07305049 | A | 11/1995 |
| JP | H07303829 | A | 11/1995 |
| JP | H10195478 | A | 7/1998 |
| JP | 10231119 | A | 9/1998 |
| JP | 2000079337 | A | 3/2000 |
| JP | 2000218154 | A | 8/2000 |
| JP | 2001049287 | A | 2/2001 |
| JP | 2002326904 | A | 11/2002 |
| JP | 2003099986 | A | 4/2003 |
| JP | 2003161893 | A | 6/2003 |
| JP | 2004083475 | A | 3/2004 |
| JP | 2004099743 | A | 4/2004 |
| JP | 2005194308 | A | 7/2005 |
| JP | 2007016161 | A | 1/2007 |
| JP | 2008156565 | A | 7/2008 |
| JP | 2009035454 | A | 2/2009 |
| JP | 2009280533 | A | 12/2009 |
| JP | 2009290236 | A | 12/2009 |
| JP | 2017080651 | A | 5/2017 |
| KR | 20090082704 | A | 7/2009 |
| KR | 20150100309 | A | 9/2015 |
| WO | 8403630 | A1 | 9/1984 |
| WO | 9308600 | A1 | 4/1993 |
| WO | 93/22417 | A1 | 11/1993 |
| WO | 9747720 | A2 | 12/1997 |
| WO | 9812298 | A2 | 3/1998 |
| WO | 9826808 | A2 | 6/1998 |
| WO | 9844084 | A1 | 10/1998 |
| WO | 9917736 | A1 | 4/1999 |
| WO | 9921532 | A1 | 5/1999 |
| WO | 9924159 | A1 | 5/1999 |
| WO | 9948479 | A1 | 9/1999 |
| WO | 0032601 | A2 | 6/2000 |
| WO | 0041528 | A2 | 7/2000 |
| WO | 0065019 | A1 | 11/2000 |
| WO | 0067718 | A1 | 11/2000 |
| WO | 200065020 | A1 | 11/2000 |
| WO | 0141915 | A1 | 6/2001 |
| WO | 0162376 | A1 | 8/2001 |
| WO | 0174310 | A2 | 10/2001 |
| WO | 03002248 | A1 | 1/2003 |
| WO | 03020867 | A1 | 3/2003 |
| WO | 2004006967 | A1 | 1/2004 |
| WO | 2004060418 | A1 | 7/2004 |
| WO | 2004096895 | A2 | 11/2004 |
| WO | 2005047232 | A1 | 5/2005 |
| WO | 2005055990 | A1 | 6/2005 |
| WO | 2006027664 | A2 | 3/2006 |
| WO | 2007040517 | A1 | 4/2007 |
| WO | 2007128326 | A1 | 11/2007 |
| WO | 2007137441 | A1 | 12/2007 |
| WO | 2008005693 | A2 | 1/2008 |
| WO | 2008016637 | A1 | 2/2008 |
| WO | 2008129028 | A1 | 10/2008 |
| WO | 2008145874 | A1 | 12/2008 |
| WO | 2008104352 | A3 | 1/2009 |
| WO | 2009047127 | A1 | 4/2009 |
| WO | 2009080695 | A1 | 7/2009 |
| WO | 2009095823 | A1 | 8/2009 |
| WO | 2009093812 | A3 | 10/2009 |
| WO | 2009150017 | A1 | 12/2009 |
| WO | 2010009976 | A2 | 1/2010 |
| WO | 2010079458 | A3 | 1/2011 |
| WO | 2011054389 | A1 | 5/2011 |
| WO | 2011056935 | A1 | 5/2011 |
| WO | 2012022034 | A1 | 2/2012 |
| WO | 2012022736 | A1 | 2/2012 |
| WO | 2013026657 | A1 | 2/2013 |
| WO | 2014029695 | A1 | 2/2014 |
| WO | 2014104369 | A1 | 3/2014 |
| WO | 2014189906 | A2 | 11/2014 |
| WO | 2015041791 | A1 | 3/2015 |
| WO | 2015070228 | A1 | 5/2015 |
| WO | 2015191517 | A1 | 12/2015 |
| WO | 2016014733 | A1 | 1/2016 |
| WO | 2017004339 | A1 | 1/2017 |
| WO | 2017058875 | A1 | 4/2017 |
| WO | 2020118020 | A1 | 6/2020 |
| WO | 2020214875 | A1 | 10/2020 |
| WO | 2020214891 | A1 | 10/2020 |

OTHER PUBLICATIONS

Cheng et al., "Preparation of monodisperse poly(N-isopropylacrylamide) microspheres and microcapsules via Shirasu-porous-glass membrane emulsification", Science Direct, Desalination 234, 2008, pp. 184-194.

Database WPI, week 201566, Thompson Scientific, London GB, an 2015-53862D, XP002794945.

Database WPI, week 201566, Thompson Scientific, London GB, an 2015-53862D, XP002799564.

Fernandes et al., "Influence of Spray Drying Operating Conditions on Microencapsulated Rosemary Essential Oil Properties", Ciência e Tecnologia de Alimentos, vol. 33, Suppl. 1, 2013, pp. 171-178.

Fowkes, F.M., "Attractive Forces at Interfaces", Industrial and Engineering Chemistry, vol. 56, No. 12, 1964, pp. 40-52.

Good, et al., A Theory for Estimation of Surface and Interfacial Energies, III, Estimation of Surface Energies or Solids from Contact Angle Data, The Journal of Physical Chemistry, vol. 64, May 1960, pp. 561-565.

Herbig, James A., "Microencapsulation", Kirk Othmer Encyclopedia of Chemical Technology, vol. 13, Second Edition, pp. 436-456.

(56) References Cited

OTHER PUBLICATIONS

Huber et al, "Capsular Adhesives", Tappi, vol. 49, No. 5, May 1966, pp. 41A-44A.
Jyothi et al, "Microencapsulation techniques, factors influencing encapsulation efficiency", Journal of Microencapsulation, 27:3, pp. 187-197.
Ichemco, Selvol 540, Mar. 14, 2013., 1 page.
Leo et al, "Methods of Calculating Partition Coefficients", Comprehensive Medicinal Chemistry, vol. 4, 1990, pp. 295-319.
Sekisui: Selvol Polyvinyl Alcohol—A Versatile High Performance Polymer; Mar. 30, 2015, pp. 1-9, XP055422301, retrieved from the Internet: URL: http://www. sekisui-sc.com/wp-content/uploads/SelvolPVOH_Brochure_EN.pdf [retrieved on Nov. 7, 2017] the whole document.
Takenaka et al., "Preparation of enteric-coated microcapsules for tableting by spray-drying technique and in Vitro simulation of drug release from the tablet in GI tract", Journal of Pharmaceutical Sciences, vol. 69, Issue 12, Dec. 1980, pp. 1388-1392.
Thompson et al., "Colloidosomes: Synthesis, properties and applications", Journal of Colloid and Interface Science, 447, 2015, pp. 217-228.
U.S. Appl. No. 17/500,975, filed on Oct. 14, 2021, to Johan Smets et. al.
U.S. Appl. No. 17/500,978, filed on Oct. 14, 2021, to Johan Smets et al.
Uppalapati et el., "Effect of External Lubricant on Mechanical Properties of Dry-Pressed Green Bodies", Journal of the American Ceramic Society, 2005, vol. 88, No. 6, pp. 1397-1402.
Vladisavljevic et al., "Recent developments in manufacturing emulsions and particulate products using membranes", Advances in Colloid and Interface Science, vol. 113, No. 1, Mar. 17, 2005, pp. 1-20.
Washburn, Edward W., "The Dynamics of Capillary Flow", Physical Review Journals, vol. 17, No. 3, 1921, pp. 374-375.
Xie et al., "The Effects of Rheological Properties of Wall Materials on Morphology and Particle Size Distribution of Microcapsulein Czech", Journal of Food Science, 2010, vol. 28, No. 5, pp. 433-439.
Zhang, Z. et al, "Mechanical Properties of Melamine-FormaldehydeMicrocapsules", Journal of Microencapsulation, vol. 18, No. 5, 2001, pp. 593-602.
Zim's Crack Creme (R),2003, Perfects Products, Inc., Berlin Center, Ohio 44401, pp. 1-3.
All Office Actions; U.S. Appl. No. 19/016,002, filed on Jan. 10, 2025.
U.S. Appl. No. 19/016,002, filed on Jan. 10, 2025, to Johan Smets et. al.

* cited by examiner

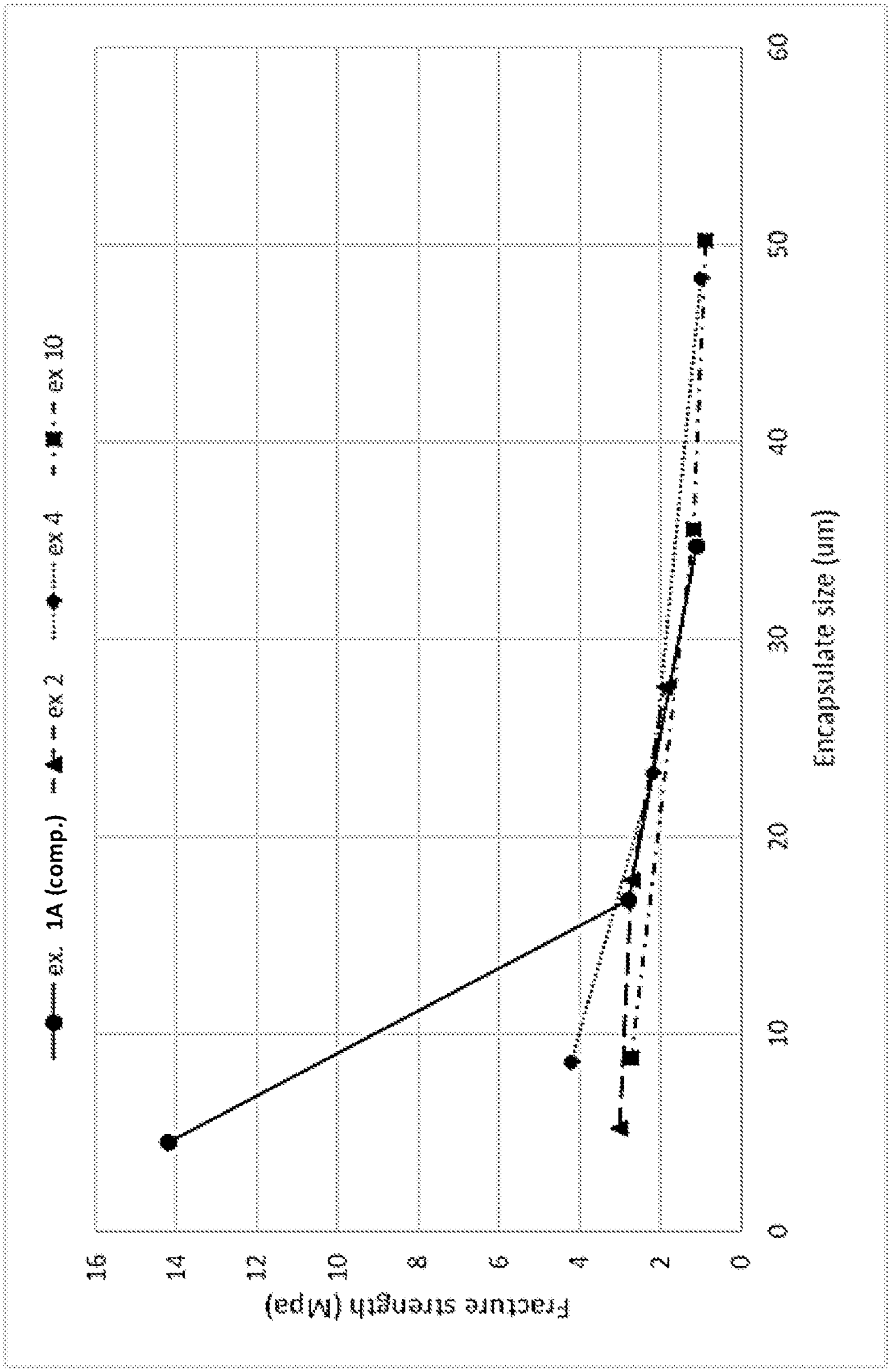
ex. 1A (comp.)
ex 2
ex 4
ex 10
Fracture strength (Mpa)
Encapsulate size (um)
0
2
4
6
8
10
12
14
16
0
10
20
30
40
50
60

CONSUMER PRODUCT COMPOSITIONS COMPRISING A POPULATION OF ENCAPSULATES

FIELD OF THE INVENTION

The present disclosure relates to consumer product compositions that include a treatment adjunct and a population of core/shell encapsulates, where the shell includes an acrylate material. The present disclosure also relates to related methods of using and making such compositions.

BACKGROUND OF THE INVENTION

It is known to use encapsulates in consumer product compositions, such as fabric care compositions, to deliver benefit agents such as perfume. The encapsulates typically include a polymeric shell or wall material that surrounds a core, where the benefit agent can be found.

The encapsulates may be characterized by a fracture strength, related to the force required to rupture the capsule and substantially release the benefit agent. However, capsules of different sizes may have vastly different fracture strengths, resulting in different release profiles across different touchpoint.

The different fracture strengths may lead to inconsistent performance from one treated surface to another treated surface when encapsulates of varying sizes deposit differently onto different surfaces.

For example, in a fabric care context, the different fracture strengths may lead to inconsistent performance from fabric load to fabric load, or even from garment to garment in the same load. It is believed that this is due to encapsulates of different sizes depositing differently on different types of fabrics. Thus, if smaller capsules are more likely to deposit on a first fabric while larger capsules are more likely to deposit on a second fabric, the freshness profiles at particular touchpoints for each fabric may be different due to the inconsistent fracture strengths of the encapsulates, resulting in consumer dissatisfaction.

There is a need for consumer product compositions that provide consistent freshness performance, particularly on a variety of surfaces, such as fabrics.

SUMMARY OF THE INVENTION

The present disclosure relates to fabric care compositions that include a population of encapsulates.

For example, the present disclosure relates to consumer product compositions that include a treatment adjunct and a population of encapsulates, where the encapsulates include a core and a shell surrounding the core, where the shell comprises an acrylate material, where the core includes a benefit agent, where the core and the shell are present in a core:shell weight ratio of at least 95:5 for the population, where the population of encapsulates is characterized by a Broadness Index of at least 1.0, and where the population of encapsulates is characterized by a Delta Fracture Strength of less than 400%. The population of encapsulates may include: first encapsulates at a $5^{th}$-percentile volume-weighted particle size, where the first encapsulates are characterized by a first fracture strength; second encapsulates at a $90^{th}$-percentile volume-weighted particle size, where the second encapsulates are characterized by a second fracture strength; where at least one of the following is true: (i) the first and second average fracture strengths are each and independently from about 0.5 to about 10 MPa, preferably from about 0.5 to about 8 MPa, more preferably from about 0.5 to about 5 MPa; and/or (ii) the difference between the first and second average fracture strengths is less than 10 MPa, preferably less than 6 MPa, preferably less than 4 MPa.

The present disclosure also relates to a consumer product composition comprising a treatment adjunct and a population of encapsulates, where the encapsulates include a core and a shell surrounding the core, where the shell includes an acrylate material, where the core includes a benefit agent, where the core and the shell are present in a core:shell weight ratio of at least 95:5 for the population, and where the population of encapsulates includes: first encapsulates at a $5^{th}$-percentile volume-weighted particle size, where the first encapsulates are characterized by a first fracture strength; second encapsulates at a $90^{th}$-percentile volume-weighted particle size, where the second encapsulates are characterized by a second fracture strength; where at least one of the following is true: (i) the first and second fracture strengths are each and independently from about 0.5 to about 10 MPa, preferably from about 0.5 to about 8 MPa, more preferably from about 0.5 to about 5 MPa; and/or (ii) the difference between the first and second fracture strengths is less than 10 MPa, preferably less than 6 MPa, preferably less than 4 MPa.

The present disclosure also relates to methods of treating a fabric load, where the method includes the step of contacting the fabric load with a composition according to the present disclosure, optionally in the presence of water, and preferably where the fabric load comprises at least two types of fabric materials.

BRIEF DESCRIPTION OF THE DRAWINGS

The FIGURES herein are illustrative in nature and are not intended to be limiting.

FIG. 1 shows a graph, where the encapsulate sizes at d5, d50, and d90 of various encapsulate populations are graphed against the respective Fracture Strengths.

DETAILED DESCRIPTION OF THE INVENTION

The present disclosure relates to consumer product compositions, such as fabric care compositions, that comprise populations of encapsulates. The encapsulates of the population as described in the present disclosure may be present in a relatively wide particle size distribution—some are relatively small, some are relatively large. Without wishing to be bound by theory, it is believed that particles of different sizes are likely to deposit on different types of surfaces such as fabrics, for example, in part, through filtration mechanisms due to the particles getting caught in the threads of a fabric—for a particular thread count or thread thickness, larger particles may get caught while smaller particles pass through. Thus, a consumer product composition having a population of encapsulates with a relatively wide size distribution is likely to be effective on a wide variety of surface/fabric/garment types.

Furthermore, the encapsulates of the present disclosure are designed so as to have a relatively consistent fracture strength across the population's size distribution. Depending on the fracture strength of an encapsulate, the encapsulate may be more likely to rupture at one touchpoint than at another (for example, at a wet touchpoint vs. a dry touchpoint vs. a rubbed-fabric touchpoint). A consistent fracture strength profile across a population indicates that the encapsulates will rupture at similar touchpoints.

By combining insights related to these two vectors (encapsulate size and fracture strength) to a population of encapsulates, the consumer product compositions of the present disclosure are surprisingly effective. In short, it is believed that by providing a treatment composition that comprises a population of variously-sized particles that have relatively consistent fracture strengths regardless of size, the composition will provide a desirable, consistent performance across a variety of target surfaces, such as a variety of fabric types and loads.

One way that the desirable combination of encapsulate characteristics is achieved relates to careful selection of the amounts of core material and wall material in the encapsulates. In short, it is believed that formulating encapsulates with relatively high weight ratios of core material to wall material (e.g., 95:5 or greater) result in the desirable characteristics described herein, particularly in encapsulates having an acrylate wall material.

The materials, compositions, and processes of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product," means baby care, beauty care, fabric & home care, family care, feminine care, and/or health care products or devices intended to be used or consumed in the form in which it is sold, and not intended for subsequent commercial manufacture or modification. Such products include but are not limited to diapers, bibs, wipes; products for and/or methods relating to treating human hair, including bleaching, coloring, dyeing, conditioning, shampooing, styling; deodorants and antiperspirants; personal cleansing; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; adult incontinence products; products and/or methods relating to oral care including toothpastes, tooth gels, tooth rinses, denture adhesives, tooth whitening; over-the-counter health care including cough and cold remedies; pest control products; and water purification.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, reference to the term "(meth)acrylate" or "(meth)acrylic" is to be understood as referring to both the acrylate and the methacrylate versions of the specified monomer, oligomer and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly (meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth) acrylate, and various multifunctional(meth)acrylates. Monofunctional (meth)acrylates, i.e., those containing only one (meth)acrylate group, may also be advantageously used. Typical mono(meth)acrylates include 2-ethylhexyl (meth) acrylate, 2-hydroxyethyl (meth)acrylate, cyanoethyl (meth) acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl (meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

As used herein, "delivery particles," "particles," "encapsulates," "microcapsules," and "capsules" are used interchangeably, unless indicated otherwise.

For ease of reference in this specification and in the claims, the term "monomer" or "monomers" as used herein with regard to the wall polymer is to be understood as monomers but also is inclusive of oligomers or monomers, and prepolymers formed of the specific monomers.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Consumer Product Composition

The present disclosure relates to consumer product compositions (or simply "compositions" as used herein). The compositions of the present disclosure may comprise a population of encapsulates and a treatment adjunct, each described in more detail below.

The consumer products compositions of the present disclosure may be useful in baby care, beauty care, fabric care, home care, family care, feminine care, and/or health care applications. The consumer product compositions may be useful for treating a surface, such as fabric, hair, or skin. The consumer product compositions may be intended to be used or consumed in the form in which it is sold. The consumer product compositions may be not intended for subsequent commercial manufacture or modification.

The consumer product composition may be a fabric care composition, a hard surface cleaner composition, a dish care composition, a hair care composition (such as shampoo or conditioner), a body cleansing composition, or a mixture thereof.

The consumer product composition may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof.

The consumer product composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, a liquid dish detergent, a hair shampoo, a hair conditioner, or a mixture thereof.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a spray and may be dispensed, for example, via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

Additional components and/or features of the compositions, such as encapsulates and consumer product adjunct materials, are discussed in more detail below.

Populations of Encapsulates

The compositions and products of the present disclosure comprise populations of encapsulates.

The composition may comprise from about 0.05% to about 20%, or from about 0.05% to about 10%, or from about 0.1% to about 5%, or from about 0.2% to about 2%, by weight of the composition, of encapsulates. The composition may comprise a sufficient amount of encapsulates to provide from about 0.05% to about 10%, or from about 0.1% to about 5%, or from about 0.1% to about 2%, by weight of the composition, of perfume to the composition. When discussing herein the amount or weight percentage of the encapsulates, it is meant the sum of the shell material and the core material.

The encapsulates typically comprise a core and a shell, where the shell encapsulates the core. As described in more detail below, the core may include a benefit agent and optionally a partitioning modifier, and the shell may comprise certain polymers, namely an acrylate material.

The encapsulates may have a volume-weighted median encapsulate size from about 0.5 microns to about 100 microns, or even 10 to 100 microns, preferably from about 1 micron to about 60 microns, or even 10 microns to 50 microns, or even 20 microns to 45 microns, or even 30 to 45 microns, or even 30 to 40 microns. The encapsulates may have a volume weighted median encapsulate size of from about 30 to about 50 microns.

The population of encapsulates may have a relatively wide distribution of particle sizes. As mentioned above it is believed that a wide distribution contributes to the compositions being more effective on various types of fabrics or garments. The population of encapsulates may be characterized by a Broadness Index, which is a way of characterizing the size distribution.

The Broadness Index is calculated by determining the particle size at which 90% of the cumulative particle volume is exceeded (90% size), the particle size at which 5% of the cumulative particle volume is exceeded (5% size), and the median volume-weighted particle size (50% size; where 50% of the particle volume is both above and below this size). The values can be used in the following equation to determine the Broadness Index for a population of encapsulates.

Broadness Index=(90% size−5% size)/50% size

The population of encapsulates of the present disclosure may be characterized by a Broadness Index of at least 1.0, preferably at least 1.1, more preferably at least 1.2. The population of encapsulates may be characterized by a Broadness Index of from about 1.0 to about 2.0, or from about 1.0 to about 1.8, or from about 1.1 to about 1.6, or from about 1.1 to about 1.5, or from about 1.2 to about 1.5, or from about 1.2 to about 1.4. Relatively higher Broadness Index values indicate a relatively wider particle size distribution.

The population of encapsulates may be characterized by one or more of the following: (i) a $5^{th}$-percentile volume-weighted particle size of from about 1 micron to about 15 microns, preferably from about 5 microns to about 10 microns; (ii) a $50^{th}$-percentile (median) volume-weighted particle size of from about 15 microns to about 45 microns, preferably from about 25 microns to about 40 microns; (iii) a $90^{th}$-percentile volume-weighted particle size of from about 20 microns to about 65 microns, preferably from about 25 microns to about 50 microns; or (iv) a combination thereof.

The encapsulates may be characterized by a fracture strength. Average Fracture Strength and Delta Fracture Strength are determined according to the procedure provided in the Test Method section below.

The population of delivery particles may be characterized by an average Fracture Strength (where fracture strength is measured across several capsules at the median/$d_{50}$ size of the population, or at any other size band, as indicated) of about 0.2 MPa to about 30 MPa, or about 0.4 MPa to about 10 MPa, or about 0.6 MPa to about 5 MPa, or even from about 0.8 MPa to about 4 MPa. The population of delivery particles may be characterized by an average Fracture Strength of about 0.2 MPa to about 10 MPa, or from about 0.5 MPa to about 8 MPa, or from about 0.5 MPa to about 6 MPa, or from about 0.5 MPa to about 5 MPa, or from about 0.7 MPa to about 4 MPa, or from about 1 MPa to about 3 MPa. The population of delivery particles may be characterized by an average Fracture Strength of from about 0.2 to about 10 MPa, preferably from about 0.5 to about 8 MPa, more preferably from about 0.5 to about 5 MPa. It is believed that delivery particles having an average Fracture Strength at $d_{50}$ at these levels will perform well at one or more touchpoints that are typical for a surface, such as a fabric, treated with a composition according to the present disclosure. The population of encapsulates may be characterized by a Delta Fracture Strength. Delta Fracture Strength is a method of describing the differences in fracture strength in the population, for example, by comparing the fracture strength of the largest and smallest particles in the population. Relatively low values for Delta Fracture Strength indicate relatively low variability between the fracture strengths of the smaller and larger encapsulates in the population. In particular, it is believed that Delta Fracture Strength of less than or equal to 350% can be advantageous to provide consistent performance across the population's size distribution, and in turn consistent performance across fabrics and laundry loads.

The Delta Fracture Strength, expressed as a percentage, can be calculated using the following equation:

$$\text{Delta Fracture Strength (\%)} = \frac{FS@d_5 - FS@d_{90}}{FS@d_{50}} * 100$$

wherein the FS stands for fracture strength and FS at $d_i$ is the FS of the capsules at the percentile "i" of the volume size distribution. The delta fracture strength can be measured by the Delta Fracture Strength Test Method further described below and $d_5$, $d_{50}$, and $d_{90}$ can be measured as shown below.

The population of encapsulates may be characterized by a Delta Fracture Strength of less than or equal to 400%, or less than or equal to 350%, preferably less than or equal to 300%, more preferably less than or equal to 250%, more preferably less than or equal to 200%, more preferably less than or equal to 150%, more preferably less than or equal to 100%, more preferably less than or equal to 75%. The population of encapsulates may have a delta fracture strength of about 10% to about 400%, or from about 10% to about 350%, or about 15% to about 350%, or about 50% about 350%, or about 10% to about 230%, or about 15% to about 230%, or about 50% to about 230%, or about 15% to about 200%, or about 30% to about 200%.

As described in more detail below, the encapsulates of the present disclosure comprise a core and a shell surrounding the core. It has surprisingly been found that selecting, among other things, particular ratios of core material to shell material can result in populations of encapsulates that show improved performance. Without wishing to be bound by theory, it is believed that formulating encapsulates having a relatively high ratio of core to wall provides populations that have the desirable fracture strength profiles described in the present disclosure. Additionally, encapsulates with a high core:wall ratio can deliver a benefit agent more efficiently, requiring less wall material to deliver the same amount of benefit agent. Further, because the encapsulates have relatively high loading of benefit agent, less encapsulate material may be required for a particular composition, saving cost and/or freeing up formulation space.

The encapsulates of the present disclosure may be characterized by a core-to-polymer-wall weight ratio (also "core: polymer wall ratio," "core-wall ratio," "core:wall ratio," or even "C:W ratio" and the like, as used herein). Relatively high core:wall ratios are typically preferred to increase the delivery efficiency or relatively payload of the particles. However, if the ratio is too high, then the capsule may become too brittle or leaky and provide suboptimal performance.

As used herein, the core:polymer wall ratio is be understood as calculated on the basis of the weight of the reacted wall-forming materials and initiators that constitute the polymer wall, and for purposes of the calculation excludes in the calculation entrapped nonstructural materials, such as entrapped emulsifier. The calculation is based on the amounts of the starting inputs, namely the input monomers and initiators. A sample core:wall polymer ratio calculation is illustrated in Example 1 below. If the amounts of starting inputs are not readily available, then the core:wall ratio is determined according to the Analytical Determination of the Core:Wall Ratio procedure provided in the Test Methods section.

An encapsulate, preferably the population of encapsulates, may be characterized by a core:polymer wall weight ratio of at least about 95:5, preferably 96:4, more preferably at least about 97:3, even more preferably at least about 98:2, even more preferably at least about 99:1. An encapsulate, preferably the population of encapsulates, may be characterized by a core-to-polymer-wall weight ratio of from about 95:5 to about 99:0.5, preferably from about 96:4 to about 99.5:0.5, preferably from about 96:4 to about 99:1, more preferably from about 97:3 to about 99:1, even more preferably from about 98:2 to about 99:1. The core-to-polymer-wall weight ratio may be from about 96:4 to about 99:1, or from about 96:4 to about 98:2, or from about 97:3 to about 98:2.

Preferred populations of encapsulates have a combination of the characteristics described above. For example, a population of encapsulates may be characterized by two or more, preferably three or more, more preferably all four, of the following characteristics: a volume-weighted median size of from about 10 to about 100 microns; a Broadness Index of at least 1.0; a Delta Fracture Strength of less than or equal to 400%; and/or a core-shell ratio of greater than or equal to 95:5. Additional combinations of characteristics are provided below in Table A.

TABLE A

| Ex. | Volume-weighted median size | Broadness Index | Delta Fracture Strength | Core-shell ratio |
|---|---|---|---|---|
| A | 10 μm-100 μm | ≥1.0 | <400% | ≥95:5 |
| B | 15 μm-75 μm | ≥1.1 | <350% | ≥96:4 |
| C | 20 μm-60 μm | ≥1.2 | <300% | ≥97:3 |
| D | 30 μm-50 μm | ≥1.2 | <250% | ≥98:2 |

Components and processes related to the encapsulates of the present disclosure are described in more detail below.

a. Shell

The encapsulates of the present disclosure include a shell that surround a core. The shell comprises a shell material. To note, as used herein, the terms "shell," "wall," and "polymer wall" are used interchangeably, unless otherwise indicated.

The encapsulates of the present disclosure include a shell that surrounds a core. The shell comprises a polymeric material, specifically a (meth)acrylate polymer. The (meth) acrylate polymer is derived, at least in part, from one or more oil-soluble or oil-dispersible multifunctional (meth) acrylate monomers or oligomers.

The polymer wall may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the polymer wall, of the (meth)acrylate polymer. The polymer wall may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the polymer wall, of the oil-soluble or oil-dispersible multifunctional (meth)acrylate monomer or oligomer. The (meth)acrylate polymer may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the (meth)acrylate polymer, of the oil-soluble or oil-dispersible multifunctional (meth)acrylate monomer or oligomer.

The one or more oil-soluble or oil-dispersible multifunctional (meth)acrylate monomers or oligomers comprise at least three, preferably at least four, preferably at least five, preferably at least six, more preferably exactly six, radical polymerizable functional groups, with the proviso that at least one of the radical polymerizable functional groups is an acrylate or methacrylate group.

The one or more oil-soluble or oil-dispersible multifunctional (meth)acrylate monomers or oligomers may comprise from three to six, preferably from four to six, more preferably from five to six, most preferably six, radical polymerizable functional groups. It is believed that monomers comprising a relatively greater number of radical polymerizable groups result in, for example, delivery particles with more compact shells and having preferred properties, such as less leakage, compared to walls formed from monomers that have fewer radical polymerizable groups.

The radical polymerizable functional groups may be independently selected from the group consisting of acrylate, methacrylate, styrene, allyl, vinyl, glycidyl, ether, epoxy, carboxyl, or hydroxyl, with the proviso that at least one of the radical polymerizable groups is acrylate or methacrylate. Preferably, at least two, or at least three, or at least four, or at least five, or at least six of the radical polymerizable functional groups is an acrylate or methacrylate group. Preferably, the radical polymerizable functional groups are each independently selected from the group consisting of acrylate and methacrylate. It is believed that these functional groups result in delivery particles having preferred properties, such as less leakage at high core:wall ratios, compared to other functional groups.

The oil-soluble or oil-dispersible multifunctional (meth) acrylate monomers or oligomers may comprise a multifunctional aromatic urethane acrylate. Preferably, the oil-soluble or oil-dispersible multifunctional (meth)acrylate monomers or oligomers comprises a hexafunctional aromatic urethane acrylate.

Additionally or alternatively, the oil-soluble or oil-dispersible multifunctional (meth)acrylate monomers or oligomers may comprise a multifunctional aliphatic urethane acrylate.

The acrylate material may be derived from at least two, preferably at least three, different monomers or oligomers.

The (meth)acrylate polymer of the encapsulate shell may be derived from at least two different multifunctional (meth) acrylate monomers, for example first and second multifunctional (meth)acrylate monomers, each of which may preferably be oil-soluble or oil-dispersible. The first multifunctional (meth)acrylate monomer may comprise a different number of radical polymerizable functional groups compared to the second multifunctional (meth)acrylate monomer. For example, the first multifunctional (meth) acrylate monomer may comprise six radical polymerizable functional groups (e.g., hexafunctional), and the second multifunctional (meth)acrylate monomer may comprise less than six radical polymerizable functional groups, such as a number selected from three (e.g., trifunctional), four (e.g., tetrafunctional), or five (e.g., pentafunctional), preferably five. The first and second multifunctional (meth)acrylate monomers may be comprise the same number of radical polymerizable functional groups, such as six (e.g., both monomers are hexafunctional), although the respective monomers are characterized by different structures or chemistries.

The oil-soluble or oil-dispersible (meth)acrylate monomers may further comprise a monomer selected from an amine methacrylate, an acidic methacrylate, or a combination thereof.

The (meth)acrylate polymer of the shell may be a reaction product derived from the oil-soluble or oil-dispersible multifunctional (meth)acrylate, a second monomer, and a third monomer. Preferably, the second monomer comprises a basic (meth)acrylate monomer, and the third monomer comprises an acidic (meth)acrylate monomer. The basic (meth) acrylate monomer or oligomer may be present at less than 2% by weight of the wall polymer. The acidic (meth)acrylate monomer or oligomer may be present at less than 2% by weight of the wall polymer.

The basic (meth)acrylate monomer, and/or oligomer or prepolymers thereof, may comprise one or more of an amine modified methacrylate, amine modified acrylate, a monomer such as mono or diacrylate amine, mono or dimethacrylate amine, amine modified polyether acrylate, amine modified polyether methacrylate, aminoalkyl acrylate, or aminoalkyl methacrylate. The amines can be primary, secondary or tertiary amines. Preferably the alkyl moieties of the basic (meth)acrylate monomer are C1 to C12.

Suitable amine (meth)acrylates for use in the particles of the present disclosure may include aminoalkyl acrylate or aminoalkyl methacrylate including, for example, but not by way of limitation, ethylaminoethyl acrylate, ethylaminoethyl methacrylate, aminoethyl acrylate, aminoethyl methacrylate, tertiarybutyl ethylamino acrylate, tertiarybutyl ethylamino methacrylate, tertiarybutyl aminoethyl acrylate, tertiarybutyl aminoethyl methacrylate, diethylamino acrylate, diethylamino methacrylate, diethylaminoethyl acrylate diethylaminoethyl methacrylate, dimethylaminoethyl acrylate and dimethylaminoethyl methacrylate. Preferably, the amine (meth)acrylate is aminoethyl acrylate or aminoethyl methacrylate, or tertiarybutyl aminoethyl methacrylate.

The acidic (meth)acrylate may comprise, by way of illustration, one or more of carboxy substituted acrylates or methacrylates, preferably carboxy substituted alkyl acrylates or methacrylates, such as carboxyalkyl acrylate, carboxyalkyl methacrylate, carboxyaryl acrylate, carboxy aryl methacrylate, and preferably the alky moieties are straight chain or branched C1 to C10. The carboxyl moiety can be bonded to any carbon of the C1 to C10 alkyl moiety, preferably a terminal carbon. Carboxy substituted aryl acrylates or methacrylates can also be used, or even (meth) acryloyloxyphenylalkylcarboxy acids. The alkyl moieties of the (meth)acryloyloxyphenylalkylcarboxy acids can be C1 to C10.

Suitable carboxy (meth)acrylates for use in particles of the present disclosure may include 2-carboxyethyl acrylate, 2-carboxyethyl methacrylate, 2-carboxypropyl acrylate, 2-carboxypropyl methacrylate, carboxyoctyl acrylate, carboxyoctyl methacrylate. Carboxy substituted aryl acrylates or methacrylates may include 2-acryloyloxybenzoic acid, 3-acryloyloxybenzoic acid, 4-acryloyloxybenzoic acid, 2-methacryloyloxybenzoic acid, 3-methacryloyloxybenzoic acid, and 4-methacryloyloxybenzoic acid. (Meth)acryloyloxyphenylalkylcarboxy acids by way of illustration and not limitation can include 4-acryloyloxyphenylacetic acid or 4-methacryloyloxyphenylacetic acid.

In addition to the oil-soluble or oil-dispersible multifunctional (meth)acrylate monomer or oligomer, the (meth) acrylate polymer of the shell may be further derived from a water-soluble or water-dispersible mono- or multifunctional (meth)acrylate monomer or oligomer, which may include a hydrophilic functional group. The water-soluble or water-dispersible mono- or multifunctional (meth)acrylate monomer or oligomer may be preferably selected from the group consisting of amine (meth)acrylates, acidic (meth)acrylates, polyethylene glycol di(meth)acrylates, ethoxylated monofunctional (meth)acrylates, ethoxylated multi-functional (meth)acrylates, other (meth)acrylate monomers, other (meth)acrylate oligomers, and mixtures thereof.

When making the encapsulate populations, optionally emulsifier may be included, preferably in the water phase. The emulsifier may be a polymeric emulsifier. Emulsifier can help with further stabilizing the emulsion. In formation of the shell of the delivery particle, the polymeric emulsifier can become entrapped in the polymer wall material. These inclusions of emulsifier into the shell usefully can be used to advantage in modification of polymer wall properties, influencing such attributes as flexibility, leakage, strength, and other properties. Thus, the shell of the delivery particles may further comprise a polymeric emulsifier entrapped in the shell, preferably wherein the polymeric emulsifier comprises polyvinyl alcohol. As indicated above, however, the entrapped polymeric emulsifier is not to be included when determining the core:shell weight ratio.

The encapsulates may comprise from about 0.5% to about 40%, preferably from about 0.5% to about 20%, more preferably 0.8% to 5% of an emulsifier, based on the weight of the wall material. Preferably, the emulsifier is selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water. The emulsifier preferably comprises polyvinyl alcohol, and the polyvinyl alcohol preferably has a hydrolysis degree from about 55% to about 99%, preferably from about 75% to about 95%, more preferably from about 85% to about 90% and most preferably from about 87% to about 89%. The polyvinyl alcohol may have a viscosity of from about 40 cps to about 80 cps, preferably from about 45 cps to about 72 cps, more preferably from about 45 cps to about 60 cps and most preferably 45 cps to 55 cps in an aqueous 4% polyvinyl alcohol solution at 20° C.; the viscosity of a polymer is determined by measuring a freshly made solution using a Brookfield LV type viscometer with UL adapter as described in British Standard EN ISO 15023-2:2006 Annex E Brookfield Test method. The polyvinyl alcohol may have a degree of polymerization of from about 1500 to about 2500, preferably from about 1600 to about 2200, more preferably from about 1600 to about 1900 and most preferably from about 1600 to about 1800. The weight average molecular weight of the polyvinyl alcohol may be of from about 130,000 to about 204,000 Daltons, preferably from about 146,000 to about 186,000, more preferably from about 146,000 to about 160,000, and most preferably from about 146,000 to about 155,000, and/or has a number average molecular weight of from about 65,000 to about 110,000 Daltons, preferably from about 70,000 to about 101,000, more preferably from about 70,000 to about 90,000 and most preferably from about 70,000 to about 80,000.

The acrylate material, preferably the (meth)acrylate polymer, of the shell may be further derived, at least in part, from at least one free radical initiator, preferably at least two free radical initiators. The at least one free radical initiator may preferably comprise a water-soluble or water-dispersible free radical initiator. One or more free radical initiators can provide a source of free radicals upon activation.

Without wishing to be bound by theory, it is believed that selecting the appropriate amount of initiator relative to total wall material (and/or wall monomers/oligomers) can result in improved capsules. For example, it is believed that levels of initiators that are too low may lead to poor polymer wall formation; levels that are too high may lead to encapsulate walls that have relatively low levels of structural monomers. In either situation, the resulting capsules may be relatively leaky and/or weak. It is further believed that the optimization of encapsulate wall formation, aided by proper selection of relative initiator level, is particularly important for capsules having relatively high core:wall ratios, given that the amount of wall material is relatively low.

Thus, the amount of initiator present may be from about 2% to about 50%, preferably from about 5% to about 40%, more preferably from about 10% to about 40%, even more preferably from about 15% to about 40%, even more preferably from about 20% to about 35%, or more preferably from about 20% to about 30%, by weight of the polymer wall (e.g., wall monomers plus initiators, excluding embedded polymeric emulsifiers, as described herein for core:wall ratios). It is believed that relatively higher amounts of initiator within the disclosed ranges may lead to improved, less-leaky capsules. The optimal amount of initiator may vary according to the nature of the core material. The (meth)acrylate polymer of the polymer wall may be derived from a first initiator and a second initiator, wherein the first and second initiators are present in a weight ratio of from about 5:1 to about 1:5, or preferably from about 3:1 to about 1:3, or more preferably from about 2:1 to about 1:2, or even more preferably from about 1.5:1 to about 1:1.5.

Suitable free radical initiators may include peroxy initiators, azo initiators, peroxides, and compounds such as 2,2'-azobismethylbutyronitrile, dibenzoyl peroxide. More particularly, and without limitation, the free radical initiator can be selected from the group of initiators comprising an azo or peroxy initiator, such as peroxide, dialkyl peroxide, alkylperoxide, peroxyester, peroxycarbonate, peroxyketone and peroxydicarbonate, 2,2'-azobis (isobutylnitrile), 2,2'-azobis (2,4-dimethylpentanenitrile), 2,2'-azobis (2,4-dimethylvaleronitrile), 2,2'-azobis(2-methylpropanenitrile), 2,2'-azobis (2-methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl) peroxydicarbonate, di(2-ethylhexyl)peroxydicarbonate, 1,1-dimethyl-3-hydroxybutyl peroxyneodecanoate, a-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, dit-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like.

The shells of the encapsulates may comprise a coating, for example on an outer surface of the shell, away from the core. The encapsulates may be manufactured and be subsequently coated with a coating material. The coating may be useful as a deposition aid. The coating may comprise a cationic material, such as a cationic polymer. As indicated above, however, a coating that is not a structural or support feature of the wall is not to be included in calculations when determining the core:wall polymer weight ratio.

Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise polyvinyl formamide, chitosan, or combinations thereof, preferably chitosan.

b. Benefit Agent

The encapsulates of the present disclosure include a core. The core may comprise a benefit agent. Suitable benefit agents located in the core may include benefit agents that provide benefits to a surface, such as a fabric or hair.

The core may comprise from about 20% to about 100%, or from about 20% to about 99%, or from about 45% to about 95%, preferably from about 50% to about 80%, more preferably from about 50% to about 70%, by weight of the core, of the benefit agent, which may preferably comprise perfume raw materials.

The benefit agent may be selected from the group consisting of perfume raw materials, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes and mixtures thereof.

Preferably, the encapsulated benefit agent may include perfume raw materials. The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The benefit agent may comprise perfume raw materials that have a log P of from about 2.5 to about 4. It is understood that other perfume raw materials may also be present in the core.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

c. Partitioning Modifier

The core of the encapsulates of the present disclosure may comprise a partitioning modifier. The properties of the oily material in the core can play a role in determining how much, how quickly, and/or how permeable the polyacrylate shell material will be when established at the oil/water interface. For example, if the oil phase comprises highly polar materials, these materials may reduce the diffusion of the acrylate oligomers and polymers to the oil/water interface and result in a very thin, highly permeable shell. Incorporation of a partitioning modifier can adjust the polarity of the core, thereby changing the partition coefficient of the polar materials in the partitioning modifier versus the acrylate oligomers, and can result in the establishment of a well-defined, highly impermeable shell. The partitioning modifier may be combined with the core's perfume oil material prior to incorporation of the wall-forming monomers.

The core may comprise, in addition to the encapsulated benefit agent, from greater than 0% to about 80%, preferably from greater than 0% to about 50%, more preferably from greater than 0% to about 30%, most preferably from greater than 0% to about 20%, based on total core weight, of a partitioning modifier. The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described benefit agent encapsulates.

d. Method of Making Encapsulates

Encapsulates may be made according to known methods, so long as the core:shell ratios described herein are observed. Methods may be further adjusted to arrive at other desirable characteristics described herein, such as volume-weighted particle size, relative amounts of benefit agent and/or partitioning modifier, etc.

For example, the present disclosure relates to a process of making a population of delivery particles comprising a core and a polymer wall encapsulating the core. The process may comprise the step of providing an oil phase. The oil phase may comprise a benefit agent and a partition modifier, as described above. The process may further comprise dissolving or dispersing into the oil phase one or more oil-soluble or dispersible multifunctional (meth)acrylate monomers or oligomers having at least three, and preferably at least four, at least five, or even at least six radical polymerizable functional groups with the proviso that at least one of the radical polymerizable groups is acrylate or methacrylate.

The oil-soluble or dispersible multifunctional (meth)acrylate monomers or oligomers are described in more detail above. Among other things, the oil-soluble or dispersible multifunctional (meth)acrylate monomers or oligomers may comprise a multifunctional aromatic urethane acrylate, preferably a tri-, tetra-, penta-, or hexafunctional aromatic urethane acrylate, or mixtures thereof, preferably comprising a hexafunctional aromatic urethane acrylate. The monomer or oligomer may comprise one or more multifunctional aliphatic urethane acrylates, which may be dissolved or dispersed into the oil phase. The process may further comprise dissolving or dispersing one or more of an amine (meth) acrylate or an acidic (meth)acrylate into the oil phase.

The process may further comprise providing a water phase, which may comprise an emulsifier, a surfactant, or a combination thereof. The process may further comprise the step of dissolving or dispersing into the water phase one or more water-soluble or water-dispersible mono- or multi-functional (meth)acrylate monomers and/or oligomers.

The process may comprising a step of dissolving or dispersing in into the water phase, the oil phases, or both, of one or more amine (meth)acrylates, acidic (meth)acrylates, polyethylene glycol di(meth)acrylates, ethoxylated mono- or multi-functional (meth)acrylates, and/or other (meth) acrylate monomers and/or oligomers.

In general, the oil soluble multifunctional (meth)acrylate monomer is soluble or dispersible in the oil phase, typically soluble at least to the extent of 1 gram in 100 ml of the oil, or dispersible or emulsifiable therein at 22 C. The water soluble multifunctional (meth)acrylate monomers are typically soluble or dispersible in water, typically soluble at least to the extent of 1 gram in 100 ml of water, or dispersible therein at 22 C.

Typically, the oil phase is combined with an excess of the water phase. If more than one oil phase is employed, these generally are first combined, and then combined with the water phase. If desired, the water phase can also comprise one or more water phases that are sequentially combined.

The oil phase may be emulsified into the water phase under high shear agitation to form an oil-in-water emulsion, which may comprise droplets of the core materials dispersed in the water phase. Typically, the amount of shear agitation applied can be controlled to form droplets of a target size, which influences the final size of the finished encapsulates.

The dissolved or dispersed monomers may be reacted by heating or actinic irradiation of the emulsion. The reaction can form a polymer wall at an interface of the droplets and the water phase. The radical polymerizable groups of the multifunctional methacrylate, upon heating, facilitate self-polymerization of the multifunctional methacrylate.

One or more free radical initiators may be provided to the oil phase, the water phase, or both, preferably both. For example, the process may comprise adding one or more free radical initiators to the water phase, for example to provide a further source of free radicals upon activation by heat. The process may comprise adding one or more free radical initiators to the oil phase. The one or more free radical initiators may be added to the water phase, the oil phase, or both in an amount of from greater than 0% to about 5%, by weight of the respective phase. Latent initiators are also contemplated where a first action, particularly a chemical reaction, is needed to transform the latent initiator into an active initiator which subsequently initiates polymerization upon exposure to polymerizing conditions. Where multiple initiators are present, it is contemplated, and preferred, that each initiator be initiated or suitably initiated by a different condition.

Alternatively, the reacting step may be carried out in the absence of an initiator, as it has surprisingly been found that encapsulates may form, even when a free radical initiator is not present.

In the described process, the heating step may comprise heating the emulsion from about 1 hour to about 20 hours, preferably from about 2 hours to about 15 hours, more preferably about 4 hours to about 10 hours, most preferably from about 5 to about 7 hours, thereby heating sufficiently to transfer from about 500 joules/kg to about 5000 joules/kg to said emulsion, from about 1000 joules/kg to about 4500 joules/kg to said emulsion, from about 2900 joules/kg to about 4000 joules/kg to said emulsion.

Prior to the heating step, the emulsion may be characterized by a volume-weighted median particle size of the emulsion droplets of from about 0.5 microns to about 100 microns, even from about 1 microns to about 60 microns, or even from 20 to 50 microns, preferably from about 30 microns to about 50 microns, with a view to forming a population of delivery particles with a volume-weighted target size, for example, of from about 30 to about 50 microns.

The benefit agent may be selected as described above, and is preferably a fragrance that comprises one or more perfume raw materials. The benefit agent may be the primary, or even only component, of the oil phase into which the other materials are dissolved or dispersed.

The partitioning modifier may be selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate. The partitioning modifier may be provided in an amount so as to comprise from about 5% to about 55% by weight of the core of the delivery particle.

As described above, it is desirable for the resulting delivery particles to be characterized by a core to polymer wall weight of from 96:4 to about 99.5:0.5. It is also desirable for the resulting delivery particles to be characterized by a volume-weighted median particle size of from about 30 to about 50 microns.

As a result of the method of making delivery particles provided herein, the delivery particles may be present in an aqueous slurry, for example, the particles may be present in the slurry at a level of from about 20% to about 60%, preferably from about 30% to about 50%, by weight of the slurry. Additional materials may be added to the slurry, such as preservatives, solvents, structurants, or other processing or stability aids. The slurry may comprise one or more perfumes (i.e., unencapsulated perfumes) that are different from the perfume or perfumes contained in the core of the benefit agent delivery particles.

Exemplary synthesis methods that can form encapsulates according the present disclosure are further described in Example 1 below.

e. Optional Second Population of Encapsulates

The treatment compositions of the present disclosure may include more than one population of encapsulates. For example, the composition may comprise a first population and a second population, where the second population is different from the first population in some way. A composition having first and second populations of encapsulates may be able to provide, for example, improved performance across more touchpoints or across different fabric/load types.

For example, the composition may comprise a population of encapsulates as described above, which may be a first population of encapsulates. The composition may further comprise a second population of encapsulates, wherein the encapsulates of the second population comprise a core and a shell surrounding the core, wherein the core comprises a benefit agent. Preferably, the encapsulates are characterized by one or more of the following, where "different" means a different composition or value compared to the same characteristic of the first population of encapsulates: a different core composition, a different benefit agent, a different shell, a different core:shell weight ratio, a different volume-weighted median particle size, a different $5^{th}$-percentile volume-weighted particle size, a different $90^{th}$-percentile volume-weighted particle size, a different Broadness Index, a different Delta Fracture Strength, a different average Fracture strength for Particles at the $5^{th}$-percentile volume-weighted particle size, a different average Fracture Strength for particles at the $90^{th}$-percentile volume-weighted particle size, different curing times, different curing temperatures, or combinations thereof.

For example, the encapsulates of the second population may have similar shell materials and core:shell ratios, but different benefit agents in the core, preferably different mixtures of perfume raw materials, compared to the first population.

It may be that the encapsulates of the second population include a different shell, for example by being made of different shell materials. For example, the encapsulates of the second population may include (second) shell materials formed from different acrylate monomers than the first population. The second population may include (second) shell materials that comprise aminoplasts, such as melamine-containing polymers, and/or polyurea-containing polymers.

It may be that the encapsulates of the second population are characterized by a different core:shell ratio than the first. For example, the second population may be characterized by a core:shell ratio of less than 95:5, or equal to or less than 92:8, or equal to or less than 90:10, or equal to or less than 88:12.

The first and second populations may be present in a weight ratio that is from about 10:1 to about 1:10, or from about 4:1 to about 1:4, or from about 3:1 to about 1:3, or from about 2:1 to about 1:2, or about 1:1.

Consumer Product Adjunct Material

The compositions of the present disclosure, which may be consumer products, may comprise a consumer product adjunct material. The consumer product adjunct material may provide a benefit in the intended end-use of a composition, or it may be a processing and/or stability aid.

Suitable consumer product adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, and/or pigments.

Depending on the intended form, formulation, and/or end-use, compositions of the present disclosure or may not may not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

a. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

b. Conditioning Active

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

c. Deposition Aid

The compositions of the present disclosure may comprise a deposition aid. Deposition aids can facilitate deposition of encapsulates, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with encapsulates (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

d. Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

Process of Making a Composition

The present disclosure relates to processes for making any of the compositions described herein. The process of making a composition, which may be a consumer product, may comprise the step of combining an encapsulate as described herein with a consumer product adjunct material as described herein.

The encapsulates may be combined with such one or more consumer product adjuncts materials when the encapsulates are in one or more forms, including a slurry form, neat encapsulate form, and/or spray dried encapsulate form. The encapsulates may be combined with such consumer product adjuncts materials by methods that include mixing and/or spraying.

The compositions of the present disclosure can be formulated into any suitable form and prepared by any process chosen by the formulator. The encapsulates and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

Method of Treating a Surface or Article

The present disclosure further relates to methods of treating a surface or article with a composition according to the present disclosure. Such methods may provide cleaning, conditioning, and/or freshening benefits.

Suitable surfaces or articles may include fabrics (including clothing, towels, or linens), hard surfaces (such as tile, porcelain, linoleum or wood floors), dishware, hair, skin, or mixtures thereof.

The method may include a step of contacting a surface or article with a composition of the present disclosure. The composition may be in neat form or diluted in a liquor, for example, a wash or rinse liquor. The composition may be diluted in water prior, during, or after contacting the surface or article. The surface or article may be optionally washed and/or rinsed before and/or after the contacting step.

The method of treating and/or cleaning a surface or article may include the steps of:

a) optionally washing, rinsing and/or drying the surface or article;

b) contacting the surface or article with a composition as described herein, optionally in the presence of water;

c) optionally washing and/or rinsing the surface or article; and d) optionally dried by drying passively and/or via an active method such as a laundry dryer.

For purposes of the present invention, washing includes but is not limited to, scrubbing, and mechanical agitation. The fabric may comprise most any fabric capable of being laundered or treated in normal consumer use conditions.

Liquors that may comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

As described above, it is believed that the treatment composition of the present disclosure are particularly suited to treating a plurality of fabric types. The plurality of fabric types may be part of the same fabric load, where they are treated substantially simultaneously, or they may be in separate loads, where they may be treated in sequence/non-simultaneously.

The present disclosure relates to a method of treating a fabric load, wherein the method comprises the step of contacting the fabric load with a composition according to the present disclosure, optionally in the presence of water. Diluting the composition with water can create a treatment liquor that contacts the fabric load. Preferably, the fabric load comprises at least two types of fabric materials, e.g., a first fabric material and a second fabric material. The fabric load may comprise a first fabric material that is 100% cotton, and optionally a second fabric material that is not 100% cotton. The second fabric material may be selected from polyester, a synthetic blend, or a mixture thereof. The fabric load may comprise a first fabric material that is characterized by a first thread count and further comprise a second fabric material is characterized by a second thread count that is different than the first thread count. The first fabric material may be part of a first article or first garment, and the second fabric material may be part of a second article or second garment. The first fabric material may be located at a first location of a first article or garment, and the second fabric material may be located at a second location of the first article or garment.

The method of the present disclosure may comprise contacting a first fabric load with a composition of the present disclosure in a first treatment process (e.g., a first wash or rinse process). The method may further comprise contacting a second fabric load with a composition of the present disclosure in a second treatment process (e.g., a second wash or rinse process). The composition used in the first and second treatment processes may be the same composition, housed in the same container. The first fabric load may comprise the first fabric material; the second fabric load may comprise the second fabric material.

Combinations

Specifically contemplated combinations of the disclosure are herein described in the following lettered paragraphs. These combinations are intended to be illustrative in nature and are not intended to be limiting.

A. A consumer product composition comprising a treatment adjunct and a population of encapsulates, wherein the encapsulates comprise a core and a shell surrounding the core, wherein the shell comprises an acrylate material, wherein the core comprises a benefit agent, wherein the core and the shell are present in a core:shell weight ratio of at least 95:5 for the population, wherein the population of encapsulates is characterized by a Broadness Index of at least 1.0, and a Delta Fracture Strength of less than 400%.

B. The consumer product composition according to paragraph A, wherein the population of encapsulates comprises: first encapsulates at a $5^{th}$-percentile volume-weighted particle size, wherein the first encapsulates are characterized by a first average Fracture Strength; second encapsulates at a $90^{th}$-percentile volume-weighted particle size, wherein the second encapsulates are characterized by a second average Fracture Strength; wherein at least one of the following is true: (i) the first and second average Fracture Strengths are each and independently from about 0.5 to about 10 MPa, preferably from about 0.5 to about 8 MPa, more preferably from about 0.5 to about 5 MPa; and/or (ii) the difference between the first and second average Fracture Strengths is less than 10 MPa, preferably less than 6 MPa, preferably less than 4 MPa.

C. A consumer product composition comprising a treatment adjunct and a population of encapsulates, wherein the encapsulates comprise a core and a shell surrounding the core, wherein the shell comprises an acrylate material, wherein the core comprises a benefit agent, wherein the core and the shell are present in a core:shell weight ratio of at least 95:5 for the population, and wherein the population of encapsulates comprises: first encapsulates at a $5^{th}$-percentile volume-weighted particle size, wherein the first encapsulates are characterized by a first average Fracture Strength; second encapsulates at a $90^{th}$-percentile volume-weighted particle size, wherein the second encapsulates are characterized by a second average Fracture Strength; wherein at least one of the following is true: (i) the first and second average Fracture Strengths are each and independently from about 0.5 to about 10 MPa, preferably from about 0.5 to about 8 MPa, more preferably from about 0.5 to about 5 MPa; and/or (ii) the difference between the first and second average Fracture Strengths is less than 10 MPa, preferably less than 6 MPa, preferably less than 4 MPa.

D. The consumer product composition according to any of paragraphs A-C, wherein the acrylate material comprises a (meth)acrylate polymer derived from a multifunctional (meth)acrylate monomer or oligomer having at least three radical polymerizable functional groups, with the proviso that at least one, preferably more than one, more preferably all, of the radical polymerizable groups is acrylate or methacrylate.

E. The consumer product composition according to any of paragraphs A-D, wherein the multifunctional (meth)acrylate monomer or oligomer has at least four radical polymerizable functional groups, preferably at least five, more preferably at least six, most preferably exactly six.

F. The consumer product composition according to any of paragraphs A-E, wherein the multifunctional (meth)acrylate monomer or oligomer comprises a multifunctional aromatic urethane acrylate, preferably a hexa-functional aromatic urethane acrylate.

G. The consumer product composition according to any of paragraphs A-F, wherein the acrylate material is derived from at least two, preferably at least three, different monomers or oligomers.

H. The consumer product composition according to any preceding claim, wherein the acrylate material, preferably a (meth)acrylate polymer, is further derived, at least in part, from at least one free radical initiator, preferably wherein the at least one free radical initiator is present in amount of from about 2% to about 50%, preferably from about 5% to about 40%, more preferably from about 10% to about 40%, even more preferably from about 15% to about 40%, even more preferably from about 20% to about 35%, or more preferably from about 20% to about 30%, by weight of the shell.

I. The consumer product composition according to any of paragraphs A-H, wherein the core and the shell are present in a core:shell weight ratio of from about 95:5 to about 99.5:0.5, preferably from about 96:4 to about 99:1, preferably 97:3 to about 99:1, more preferably from about 97:3 to about 98:2.

J. The consumer product composition according to any of paragraphs A-I, wherein the population of encapsulates is characterized by a Broadness Index of at least 1.1, preferably at least 1.2.

K. The consumer product composition according to any of paragraphs A-J, wherein the population of encapsulates is characterized by a Delta Fracture Strength of less than or equal to 400%, or less than or equal to 350%, preferably less than or equal to 300%, more preferably less than or equal to 250%, more preferably less than or equal to 200%, more preferably less than or equal to 150%, more preferably less than or equal to 100%, more preferably less than or equal to 75%.

L. The consumer product composition according to any of paragraphs A-K, wherein the population of encapsulates is further characterized by one or more of the following: (i) a $5^{th}$-percentile volume-weighted particle size of from about 1 micron to about 15 microns, preferably from about 5 microns to about 10 microns; (ii) a $50^{th}$-percentile (median) volume-weighted particle size of from about 15 microns to about 45 microns, preferably from about 25 microns to about 40 microns; (iii) a $90^{th}$-percentile volume-weighted particle size of from about 20 microns to about 65 microns, preferably from about 25 microns to about 50 microns; or (iv) a combination thereof.

M. The consumer product composition according to any of paragraphs A-L, wherein the core further comprises a partitioning modifier, preferably wherein said partitioning modifier comprising a material selected from the group consisting of vegetable oil, modified vegetable oil, mono-, di-, and tri-esters of C4-C24 fatty acids, isopropyl myristate, dodecanophenone, lauryl laurate, methyl behenate, methyl laurate, methyl palmitate, methyl stearate, and mixtures thereof, more preferably isopropyl myristate.

N. The consumer product composition according to any of paragraphs A-M, wherein the shell of the encapsulates further comprises a coating material, preferably wherein the coating material is selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines, copolymers of polyvinyl amines, and mixtures thereof.

O. The consumer product composition according to any of paragraphs A-N, wherein the population of encapsulates recited is a first population of encapsulates, wherein the composition further comprises a second population of encapsulates, wherein the encapsulates of the second population comprise a core and a shell surrounding the core, wherein the core comprises a benefit agent, preferably wherein the encapsulates of the second population are characterized by one or more of the following, compared to the first population of encapsulates: a different core composition, a different benefit agent, a different shell, a different core:shell weight ratio, a different volume-weighted median particle size, a different $5^{th}$-percentile volume-weighted particle size, a different $90^{th}$-percentile volume-weighted particle size, a different Broadness Index, a different Delta Fracture Strength, a different average Fracture Strength for particles at the $5^{th}$-percentile volume-weighted particle size, a different average Fracture Strength for particles at the $90^{th}$-percentile volume-weighted particle size, or combinations thereof.

P. The consumer product composition according to any of paragraphs A-O, wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

Q. The consumer product composition according to any of paragraphs A-P, wherein the composition is a fabric care composition, a hard surface cleaner composition, a dish care composition, a hair care composition, a body cleansing composition, or a mixture thereof, preferably a fabric care composition, preferably a fabric care composition that is a laundry detergent composition, a fabric conditioning composition, a laundry additive, a fabric pre-treat composition, a fabric refresher composition, or a mixture thereof.

R. The consumer product composition according to any of paragraphs A-Q, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

S. A method of treating a fabric load, wherein the method comprises contacting the fabric load with a treatment liquor, wherein the treatment liquor comprises the composition according to any of paragraphs A-R diluted with water, preferably wherein the fabric load comprises at least two types of fabric materials.

T. The method according paragraph S, wherein the fabric load comprises a first fabric material that is 100% cotton and a second fabric material that is not 100% cotton, preferably wherein the second fabric material is selected from polyester, a synthetic blend, or a mixture thereof.

U. The method according to any of paragraphs S or T, wherein the first fabric material is part of a first article or first garment, and wherein the second fabric material is part of a second article or second garment.

Test Methods

It is understood that the test methods that are disclosed in the Test Methods Section of the present application should be used to determine the respective values of the parameters of Applicant's claimed subject matter as claimed and described herein.

Extraction of Delivery Particles from Finished Products.

Except where otherwise specified herein, the preferred method to isolate delivery particles from finished products is based on the fact that the density of most such delivery particles is different from that of water. The finished product is mixed with water in order to dilute and/or release the delivery particles. The diluted product suspension is centrifuged to speed up the separation of the delivery particles. Such delivery particles tend to float or sink in the diluted solution/dispersion of the finished product. Using a pipette or spatula, the top and bottom layers of this suspension are removed and undergo further rounds of dilution and centrifugation to separate and enrich the delivery particles. The delivery particles are observed using an optical microscope equipped with crossed-polarized filters or differential interference contrast (DIC), at total magnifications of 100× and 400×. The microscopic observations provide an initial indication of the presence, size, quality and aggregation of the delivery particles.

For extraction of delivery particles from a liquid fabric enhancer finished product conduct the following procedure:

1. Place three aliquots of approximately 20 ml of liquid fabric enhancer into three separate 50 ml centrifuge tubes and dilute each aliquot 1:1 with DI water (e.g. 20 ml fabric enhancer+20 ml DI water), mix each aliquot well and centrifuge each aliquot for 30 minutes at approximately 10000×g.
2. After centrifuging per Step 1, discard the bottom water layer (around 10 ml) in each 50 ml centrifuge tube then add 10 ml of DI water to each 50 ml centrifuge tube.
3. For each aliquot, repeat the process of centrifuging, removing the bottom water layer and then adding 10 ml of DI water to each 50 ml centrifuge tube two additional times.
4. Remove the top layer with a spatula or a pipette, and
5. Transfer this top layer into a 1.8 ml centrifuge tube and centrifuge for 5 minutes at approximately 20000×g.
6. Remove the top layer with a spatula and transfer into a new 1.8 ml centrifuge tube and add DI water until the tube is completely filled, then centrifuge for 5 minutes at approximately 20000×g.
7. Remove the bottom layer with a fine pipette and add DI water until tube is completely filled and centrifuge for 5 minutes at approximately 20000×g.
8. Repeat step 7 for an additional 5 times (6 times in total).

If both a top layer and a bottom layer of enriched delivery particles appear in the above described step 1, then, immediately move to step 3 (i.e., omit step 2) and proceed steps with steps 4 through 8. Once those steps have been completed, also remove the bottom layer from the 50 ml centrifuge tube from step 1, using a spatula or/and a pipette. Transfer the bottom layer into a 1.8 ml centrifuge tube and centrifuge 5 min at approximately 20000×g. Remove the bottom layer in a new tube and add DI water until the tube is completely filled then centrifuge for 5 minutes approximately 20000×g. Remove the top layer (water) and add DI water again until the tube is full. Repeat this another 5 times (6 times in total). Recombine the delivery particle enriched and isolated top and bottom layers back together.

If the fabric enhancer has a white color or is difficult to distinguish the delivery particle enriched layers add 4 drops of dye (such as Liquitint Blue JH 5% premix from Milliken & Company, Spartanburg, South Carolina, USA) into the centrifuge tube of step 1 and proceed with the isolation as described.

For extraction of delivery particles from solid finished products that disperse readily in water, mix 1 L of DI water with 20 g of the finished product (e.g. detergent foams, films, gels and granules; or water-soluble polymers; soap flakes and soap bars; and other readily water-soluble matrices such as salts, sugars, clays, and starches). When extracting delivery particles from finished products which do not disperse readily in water, such as waxes, dryer sheets, dryer bars, and greasy materials, it may be necessary to add detergents, agitation, and/or gently heat the product and diluent in order to release the delivery particles from the matrix. The use of organic solvents or drying out of the delivery particles should be avoided during the extraction steps as these actions may damage the delivery particles during this phase.

For extraction of delivery particles from liquid finished products which are not fabric softeners or fabric enhancers (e.g., liquid laundry detergents, liquid dish washing detergents, liquid hand soaps, lotions, shampoos, conditioners, and hair dyes), mix 20 ml of finished product with 20 ml of DI water. If necessary, NaCl (e.g., 1 to 4 g NaCl) can be added to the diluted suspension in order to increase the density of the solution and facilitate the delivery particles floating to the top layer. If the product has a white color which makes it difficult to distinguish the layers of delivery particles formed during centrifugation, a water-soluble dye can be added to the diluent to provide visual contrast.

The water and product mixture is subjected to sequential rounds of centrifugation, involving removal of the top and bottom layers, re-suspension of those layers in new diluent, followed by further centrifugation, isolation and re-suspension. Each round of centrifugation occurs in tubes of 1.5 to 50 ml in volume, using centrifugal forces of up to 20,000×g, for periods of 5 to 30 minutes. At least six rounds of centrifugation are typically needed to extract and clean sufficient delivery particles for testing. For example, the initial round of centrifugation may be conducted in 50 ml tubes spun at 10,000×g for 30 mins, followed by five more rounds of centrifugation where the material from the top and bottom layers is resuspended separately in fresh diluent in 1.8 ml tubes and spun at 20,000×g for 5 mins per round.

If delivery particles are observed microscopically in both the top and bottom layers, then the delivery particles from these two layers are recombined after the final centrifugation step, to create a single sample containing all the delivery particles extracted from that product. The extracted delivery particles should be analyzed as soon as possible but may be stored as a suspension in DI water for up to 14 days before they are analyzed.

One skilled in the art will recognize that various other protocols may be constructed for the extraction and isolation of delivery particles from finished products and will recognize that such methods require validation via a comparison of the resulting measured values, as measured before and after the delivery particles' addition to and extraction from finished product.

Benefit Agent Leakage

The amount of benefit agent leakage from the delivery particles is determined according to the following method:

a.) Obtain two samples of the raw material slurry of delivery particles in such amounts so that 1 g of encapsulated perfume (e.g., 1 g perfume oil, not including the shell and/or partitioning modifier, if present) is present in each sample (or other amount as so indicated).

b.) Add one sample of the raw material slurry of delivery particles to a suitable amount of the product matrix (e.g., a liquid detergent product or an LFE product) in which the delivery particles will be employed to form 100 g total (e.g., 5 g slurry and 95 g product matrix) and label the mixture as Sample 1. Immediately use the second sample of raw material delivery particle slurry in Step d below, in its neat form without contacting product matrix, and label it as Sample 2.

c.) Age the delivery-particle-containing product matrix (Sample 1) for one week at 35° C. (or other time and/or temperature, as so indicated) in a sealed, glass jar.

d.) Using filtration, recover the delivery particles from both samples. The delivery particles in Sample 1 (in product matrix) are recovered after the aging step. The delivery particles in Sample 2 (neat raw material slurry) are recovered at the same time that the aging step began for sample 1.

e.) Treat the recovered delivery particles with a solvent to extract the benefit agent materials from the delivery particles.

f) Analyze the solvent containing the extracted benefit agent from each sample, via chromatography. Integrate the resultant benefit agent peak areas under the curve and sum these areas to determine the total quantity of benefit agent extracted from each sample.

g.) Determine the percentage of benefit agent leakage by calculating the difference in the values obtained for the total quantity of benefit agent extracted from Sample 2 minus Sample 1, expressed as a percentage of the total quantity of benefit agent extracted from Sample 2, as represented in the equation below:

$$\text{Percentage of Benefit Agent Leakage} = \left(\frac{\text{Sample 2} - \text{Sample 1}}{\text{Sample 2}}\right) \times 100$$

Viscosity

Viscosity of liquid finished product is measured using an AR 550 rheometer/viscometer from TA instruments (New Castle, DE, USA), using parallel steel plates of 40 mm diameter and a gap size of 500 µm. The high shear viscosity at 20 $s^{-1}$ and low shear viscosity at 0.05 $s^{-1}$ is obtained from a logarithmic shear rate sweep from 0.01 $s^{-1}$ to 25 $s^{-1}$ in 3 minutes time at 21° C.

Perfume, Perfume Raw Materials (PRMs), and/or Partitioning Modifier

A. Identity and Total Quantity

To determine the identity and to quantify the total weight of perfume, perfume ingredients, or Perfume Raw Materials (PRMs), or partitioning modifier in the capsule slurry, and/or encapsulated within the delivery agent encapsulates, Gas Chromatography with Mass Spectroscopy/Flame Ionization Detector (GC-MS/FID) is employed. Suitable equipment includes: Agilent Technologies G1530A GC/FID; Hewlett Packer Mass Selective Device 5973; and 5%-Phenyl-methylpolysiloxane Column J&W DB-5 (30 m length×0.25 mm internal diameter×0.25 µm film thickness). Approximately 3 g of the finished product or suspension of delivery encapsulates, is weighed and the weight recorded, then the sample is diluted with 30 mL of DI water and filtered through a 5.0 µm pore size nitrocellulose filter membrane. Material captured on the filter is solubilized in 5 mL of ISTD solution (25.0 mg/L tetradecane in anhydrous alcohol) and heated at 60° C. for 30 minutes. The cooled solution is filtered through 0.45 µm pore size PTFE syringe filter and analyzed via GC-MS/FID. Three known perfume oils are used as comparison reference standards. Data Analysis involves summing the total area counts minus the ISTD area counts and calculating an average Response Factor (RF) for the 3 standard perfumes. Then the Response Factor and total area counts for the product encapsulated perfumes are used along with the weight of the sample, to determine the total weight percent for each PRM in the encapsulated perfume. PRMs are identified from the mass spectrometry peaks.

B. Amount of Non-Encapsulated Material

In order to determine the amount of non-encapsulated perfume and (optionally) partitioning modifier material in a composition such as a slurry, the following equipment can be used for this analysis, using the analysis procedure provided after the table.

| | |
|---|---|
| Gas chromatograph/MS | Agilent GC6890 equipped with Agilent 5973N mass spectrometer or equivalent, capillary column operation, quantiation based on extracted ion capability, autosampler |
| Column for GC-MS | 30 m × 0.25 mm nominal diameter, 0.25 μm film thickness, J&W 122-5532 DB-5, or equivalent. |

To prepare a perfume standard in ISS Hexane, weigh 0.050+/−0.005 g of the desired PMC perfume oil into a 50 mL volumetric flask (or other volumetric size recalculating g of perfume oil to add). Fill to line with ISS Hexane solution from above. The ISS Hexane is a 0.1 g of Tetradecane in 4 liters of hexane.

To prepare a 5% surfactant solution, weigh 50 g+/−1 g of the sodium dodecyl sulphate in a beaker and, using purified water, transfer quantitatively to a 1 liter volumetric flask, and ensure the surfactant is fully dissolved.

To prepare the sample of the PMC composition (e.g., a slurry), confirm the composition (e.g., a slurry) is well mixed; mix if necessary. Weigh 0.3+/−0.05 g of composition sample onto the bottom of a 10 mL vial. Avoid composition on the wall of the vial.

To operate the instrument, determine a target ion for quantification for each PRM (and optionally partitioning modifier) along with a minimum of one qualifier ion, preferably two. Calibration curves are generated from the Perfume standard for each PRM. Utilizing the sample weight and individual PRM weight %, the integration of the extracted ion (EIC) for each PRM and the amount are plotted or recorded.

The amount of free oil is determined from the response of each PRM versus the calibration curve and summed over all the different perfume materials and optionally the partitioning modifier.

C. Determination of Encapsulated Material

The determination of the encapsulated oil and optionally the partitioning modifier is done by the subtraction of the weight of free/non-encapsulated oil found in the composition from the amount by weight of total oil found in the composition (e.g. a slurry).

Analytical Determination of Wall Materials

This method determines the amount of wall material. First, the wall material of particles with size larger than 0.45 micrometer are isolated via dead-end filtration. Subsequent analysis by thermogravimetric analysis allows for elimination of inorganic material and other (organic) raw material slurry ingredients.

A. Sample Preparation

The procedure applies dead-end filtration to eliminate soluble fractions of the sample. Different solvents in succession are used to maximize the removal of interfering substances prior to TGA analysis.

The following materials and/or equipment are used:

Filtration Equipment

- Vacuum pump: Millipore Model WP6122050 or equivalent.
- Thick walled vacuum tubing to connect pump with filtration device.
- Filtrations flasks 500 or 1000 ml.
- Filtration cup: e.g. 250 ml Millipore Filtration funnel ("Milli Cup"), filtration material: 0.45 micrometer membrane, solvent resistant.
- Sealable Plastic container to contain the filtration device while weighing.
- Standard laboratory glassware (glass beakers 100-250 ml, measuring cylinders 50-250 ml).

Drying Equipment

- Vacuum oven and vacuum pump (settings 60-70 C/vacuum: 30-inch Mercury vacuum).
- Desiccator or constant humidity chamber (keeping residues under controlled environment during cooling.

Solvents

- All solvents: Analytical Grade minimum: 2-Propanol, Acetone, Chloroform

The filtration procedure is as follows: To prepare the filtration device, record the weight of a pre-dried filtration device (e.g. Milli cup filter) down to 0.1-0.2 mg. Pre-drying involves the same drying steps as done for the filter after filtration is completed.

Filter the sample by weighing between 1 and 2 grams of Slurry Raw Material (note weight down to 0.1-0.2 mg) into a glass beaker (250 ml), or directly into the filtration device. Add 20 ml of deionized water and swirl to homogenize the sample. Add 80 ml of isopropylalcohol and homogenize sample with solvent; use heating to flocculate the sample. Put the filtration device onto a filtration bottle, and start up filtration with vacuum. After filtration is complete, add 100 ml Chloroform. Continue filtration. Add 10-20 ml Acetone and filter through the membrane to remove traces of chloroform. Remove the filter from the filtration system and dry it in a vacuum oven. After cooling, weigh the filter and record the weight.

Calculate the percent residue (gravimetric residue) by dividing the weight difference of Filter+Residue and Filter weight only (=net weight of residue after filtration) by the Raw Material Slurry sample weight and multiply by 100 to obtain % units. Continue with the measurement of % Residue via TGA analysis.

Thermo Gravimetric Analysis (TGA) is performed with the following equipment and settings: TGA: TA instruments Discovery TGA; Pans: Sealed Aluminum; Purge: N2 at 50 ml/min; Procedure: Ramp 10° C./min to 500° C.; TGA is coupled to a Nicolet Nexus 470 FTIR spectrometer for evolved gas.

For TGA data analysis, the weight loss between 350 and 500° C. is due to decomposition of polymer wall material of the perfume micro capsules and still residual (burned) perfume compounds. For calculation of insoluble polymer fraction this weight loss is used. At 500° C. there is still a residue which is un-burned material and should be considered when calculating the insoluble polymer fraction.

Analytical Determination of the Core:Wall Ratio

When the amount of core and wall material inputs are not readily available, the core:wall ratio of the encapsulates may be determined analytically using the methods described herein.

More specifically, the methods above allow determination (in weight) the amounts of perfume, partitioning modifier, and wall materials in the perfume capsule composition (e.g., a slurry) and can be used to calculate the core:wall ratio. This is done by dividing the total amount (by weight) of perfume plus partitioning modifier found in the composition divided by the amount (by weight) of cross-linked wall material found in the composition.

Test Method for Determining log P

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume-Weighted Particle Size and Size Distribution

The volume-weighted capsule size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 µm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/$50^{th}$ percentile, $5^{th}$ percentile, and/or $90^{th}$ percentile) are determined.

The broadness index can be calculated by determining the delivery particle size at which 90% of the cumulative particle volume is exceeded (90% size), the particle size at which 5% of the cumulative particle volume is exceeded (5% size), and the median volume-weighted particle size (50% size: 50% of the particle volume both above and below this size).

Broadness Index=((90% size)−(5% size))/50% size.

Fracture Strength Test Method

To measure average Fracture Strength for the population, and/or determine Delta Fracture Strength, three different measurements are made: i) the volume-weighted capsule size distribution; ii) the diameter of 10 individual capsules within each of 3 specified size ranges (and/or 30 individual capsules at the median volume-weighted particle size, if average Fracture Strength is to be determined), and; iii) the rupture-force of those same 30 individual capsules.

a.) The volume-weighted capsule size distribution is determined as described above. The resulting volume-weighted PSD data are plotted and recorded, and the values of the median, $5^{th}$ percentile, and $90^{th}$ percentile are determined.

b.) The diameter and the rupture-force value (also known as the bursting-force value) of individual capsules are measured via a custom computer-controlled micromanipulation instrument system which possesses lenses and cameras able to image the delivery capsules, and which possess a fine, flat-ended probe connected to a force-transducer (such as the Model 403A available from Aurora Scientific Inc, Canada) or equivalent, as described in: Zhang, Z. et al. (1999) "Mechanical strength of single microcapsules determined by a novel micromanipulation technique." *J. Microencapsulation*, vol 16, no. 1, pages 117-124, and in: Sun, G. and Zhang, Z. (2001) "Mechanical Properties of Melamine-Formaldehyde microcapsules." *J. Microencapsulation*, vol 18, no. 5, pages 593-602, and as available at the University of Birmingham, Edgbaston, Birmingham, UK.

c.) A drop of the delivery capsule suspension is placed onto a glass microscope slide, and dried under ambient conditions for several minutes to remove the water and achieve a sparse, single layer of solitary capsules on the dry slide. Adjust the concentration of capsules in the suspension as needed to achieve a suitable capsule density on the slide. More than one slide preparation may be needed.

d.) The slide is then placed on a sample-holding stage of the micromanipulation instrument. Thirty benefit delivery capsules on the slide(s) are selected for measurement, such that there are ten capsules selected within each of three pre-determined size bands. Each size band refers to the diameter of the capsules as derived from the Accusizer-generated volume-weighted PSD.

e.) The three size bands of capsules are: the Median/$50^{th}$ Percentile Diameter+/−2 µm; the $5^{th}$ Percentile Diameter+/−2 µm; and the $90^{th}$ Percentile Diameter+/−2 µm. Capsules which appear deflated, leaking or damaged are excluded from the selection process and are not measured.

i. If enough capsules are not available at a particular size band+/−2 µm, then the size band may be increased to +/−5 µm.

ii. If average Fracture Strength for the population is to be determined, then 30 (or more) capsules at the median/$50^{th}$ Percentile size band may be measured.

f) For each of the 30 selected capsules, the diameter of the capsule is measured from the image on the micromanipulator and recorded. That same capsule is then compressed between two flat surfaces, namely the flat-ended force probe and the glass microscope slide, at a speed of 2 µm per second, until the capsule is ruptured. During the compression step, the probe force is continuously measured and recorded by the data acquisition system of the micromanipulation instrument.

g.) The cross-sectional area is calculated for each of the selected capsules, using the diameter measured and assuming a spherical capsule ($\pi r^2$, where r is the radius of the capsule before compression). The rupture force is determined for each selected capsule from the recorded force probe measurements, as demonstrated in Zhang, Z. et al. (1999) "Mechanical strength of single microcapsules determined by a novel micromanipulation technique." *J. Microencapsulation*, vol 16, no. 1, pages 117-124, and in: Sun, G. and Zhang, Z. (2001) "Mechanical Properties of Melamine-Formaldehyde microcapsules." *J. Microencapsulation*, vol 18, no. 5, pages 593-602.

h.) The Fracture Strength of each of the 30 capsules is calculated by dividing the rupture force (in Newtons) by the calculated cross-sectional area of the respective capsule.

i.) Calculations:

Average Fracture Strength for the population is determined by averaging the Fracture Strength values of (at least) thirty capsules at the Median/$50^{th}$ Percentile size band.

The Delta Fracture Strength is calculated as follows:

$$\text{Delta Fracture Strength (\%)} = \frac{FS@d_5 - FS@d_{90}}{FS@d_{50}} * 100$$

where FS at $d_i$ is the FS of the capsules at the percentile i of the volume-weighted size distribution.

EXAMPLES

The examples provided below are intended to be illustrative in nature and are not intended to be limiting.

Example 1. Exemplary Synthesis of a Population of Encapsulates (98:2 Core:Wall Ratio)

An exemplary synthesis process for an encapsulate population having a core:wall ratio of approximately 98:2 is provided below. Details for the materials used are provided in Table 1, as are alternative wall monomers.

To a 1 L capacity water jacketed stainless steel reactor, 143.12 grams of perfume oil and 137.45 grams of isopropyl myristate are added and allowed to mix with the aid of a high shear mixer fitted with a mill blade, under a nitrogen environment. The solution is heated to 35 C before introducing 0.33 grams of Vazo67 (initiator) and the total mixture is subsequently heated to 70 C and is maintained at that temperature for 45 minutes before cooling the system down to 50 C. As soon as the temperature was reached, a solution, prepared separately, containing 63.05 grams of perfume oil, 0.075 grams of CD9055, 0.075 grams of TBAEMA, and 6.23 grams of CN975 is introduced into the reactor and the total mixture is allowed to mix for 10 min while at 50 C. The water phase, consisting of 107 grams of emulsifier (5% solution of PVOH 540), 340.03 grams of RO water, 0.22 grams of V-501, and 0.21 grams of NaOH (21% solution) is then added to the reactor, after stopping agitation. Milling ensues after the addition of the water phase until the particle size was reached. The emulsion is then heated first to 75 C and maintained at that temperature for 240 minutes and then heated to 95 C for 360 min before cooling it down to 25 C. At that point, the slurry is evacuated from the reactor into a container to add the rheology modifier (Xanthan gum 1.59 grams) and preservative (Acticide BWS-10; 0.61 grams). The rheology modifier is allowed to mix in for 30 min. The preservative is added last and allowed to mix for 5-10 min. The finished slurry is then characterized and tested as deemed fit.

Alternative capsules may be made according to substantially similar processes by substituting the CN975 monomer with a multifunctional acrylate monomer found in Table 1 below (e.g., EB140, SR295, SR444, TMPTA-1, SR368, or EB895).

Core:Wall Weight Ratio—Sample Calculation

The core:wall weight ratio is determined by dividing the weight of the total core material inputs (e.g., perfume oil and partitioning modifier) by the weight of the total wall material inputs (e.g., wall monomers and initiators). Alternatively, the relative percentage of core material in the particle population can be determined by dividing the weight of the total core material inputs by the sum of the total weight of the core material inputs plus the total weight of the wall material inputs and multiplying by 100; the remaining percentage (100-% core) is the relative percentage of the wall material—these numbers may then be expressed as a ratio. Similarly, the relative percentage of wall material in the particle population can be determined by dividing the total weight of the wall material inputs by the sum of the weights of the total core material inputs and the total wall material inputs and multiplying by 100.

A sample calculation for the "98:2" capsules formed by the example of this section is provided below, where the core comprises the perfume oil and a partitioning modifier (isopropyl myristate), and the wall comprises the wall monomers (CN975, CD9055, and TBAEMA) and the initiators (Vazo67 and V-501).

$$\%\ \text{core} = \frac{(\text{perfume oil} + \text{partitioning modifier})}{\left(\begin{array}{c}\text{perfume oil} + \text{partitioning modifier} + \\ \text{wall monomers} + \text{initiators}\end{array}\right)} \times 100$$

$$\%\ \text{core} = \frac{(143.12\ \text{g} + 63.05\ \text{g} + 137.45\ \text{g})}{\left(\begin{array}{c}143.12\ \text{g} + 63.05\ \text{g} + 137.45\ \text{g} + 6.23\ \text{g} + \\ 0.075\ \text{g} + 0.075\ \text{g} + 0.33\ \text{g} + 0.22\ \text{g}\end{array}\right)} \times 100$$

$$\%\ \text{core} = \frac{343.62}{350.55} \times 100 = 98.02\%\ \text{core material (and 1.98\% wall material)}$$

TABLE 1

| Name | Company/City | Chemical Description |
|---|---|---|
| CN975 | Sartomer Company, Exton, PA | hexafunctional urethane acrylate ester |
| EB140 | Allnex USA, Inc., Alpharetta, GA | ditrimethylolpropane tetraacrylate |
| SR295 | Sartomer Company, Exton, PA | pentaerythritol tetraacrylate |
| SR444 | Sartomer Company, Exton, PA | pentaerythritol triacrylate |
| TMPTA-1 | Allnex USA, Inc., Alpharetta, GA | trimethylolpropane triacrylate |
| SR368 | Sartomer Company, Exton, PA | tris (2-hydroxyethyl) isocyanurate triacrylate with aliphatic urethane acrylate |
| EB895 | Allnex USA, Inc., Alpharetta, GA | dipentaerythritol penta/hexa acrylate |
| TBAEMA | NovaSol North America Inc., Stoney Creek, ON, Canada | 2-(tert-butylamino) ethyl methacrylate |
| CD9055 | Sartomer Company, Exton, PA | acid acrylate |
| Vazo 67 (initiator) | Chemours Company, Wilmington, DE | 2,2'-azobis (2-methylbutyronitrile) |
| V-501 (initiator) | Sigma-Aldrich Corp., St. Louis, MO | 4,4'-Azobis(4-cyanovaleric acid) |

Example 2. Sample Populations of Encapsulates

Exemplary populations of encapsulates are made substantially according to the synthesis procedure of Example 1 above. Differences in the populations are provided below in Table 2A.

Ex. 1A and Ex. 1B are comparative examples, relating to encapsulates that are present in commercially available fabric care products; the encapsulates of Ex. 1A and Ex. 1B, for example, have a core:shell weight ratios outside the inventive scope of the present disclosure. The amount of initiators is provided as a percentage of the total wall material (e.g., monomers plus initiators).

TABLE 2A

| Ex. | Core:Shell Weight Ratio | Target Volume-Weighted Median Particle Size (μm) | Initiator $1^a$ (wall %) | Initiator $2^b$ (wall %) |
|---|---|---|---|---|
| 1A (comp.) | 90:10 | 18 | 4.8 | 5.8 |
| 1B (comp.) | 90:10 | 36 | 4.8 | 5.8 |
| 2 | 97:3 | 18 | 5.8 | 5.8 |

TABLE 2A-continued

| Ex. | Core:Shell Weight Ratio | Target Volume-Weighted Median Particle Size (μm) | Initiator 1[a] (wall %) | Initiator 2[b] (wall %) |
|---|---|---|---|---|
| 3 | 97:3 | 27 | 4.8 | 3.3 |
| 4 | 97:3 | 36 | 4.8 | 3.9 |
| 5 | 97:3 | 36 | 2.4 | 0 |
| 6 | 97:3 | 36 | 0 | 2.9 |
| 7 | 97:3 | 36 | 4.8 | 2.9 |
| 8 | 97.5:2.5 | 27 | 4.8 | 3.4 |
| 9 | 97.5:2.5 | 36 | 4.8 | 3.6 |
| 10 | 98:2 | 36 | 4.8 | 3.2 |
| 11 | 98:2 | 36 | 4.8 | 3.2 |
| 12 | 98:2 | 18 | 4.8 | 3.2 |

[a]Initiator 1 = 2,2'-Azobis(2-methylbutyronitrile)/CAS No.: 13472-08-7
[b]Initiator 2 = 4,4'-Azobis(4-cyanovaleric acid)/CAS No.: 2638-94-0

The encapsulate populations of Ex. 1A, 1B, and 2-12 are analyzed for volume weighted encapsulate size at various points of the size distribution (at 5%, 50%, and 90%), and the Fracture Strength at each point is determined. From this data, the Broadness Index and Delta Fracture Strength are determined according to the test methods provided above. The results are provided in Table 2B.

TABLE 2B

| | Encapsulate size (μm) | | | Broad- | Fracture Strength (MPa) | | | Delta Frac- ture |
|---|---|---|---|---|---|---|---|---|
| Ex. | @ $d_5$ | @ $d_{50}$ | @ $d_{90}$ | ness Index | @ $d_5$ | @ $d_{50}$ | @ $d_{90}$ | Strength (%) |
| 1A (comp.) | 4.5 | 16.8 | 34.7 | 1.80 | 14.2 | 2.8 | 1.1 | 467.9 |
| 1B (comp.) | 9.2 | 36.1 | 50.1 | 1.13 | 6.2 | 0.8 | 0.6 | 700.0 |
| 2 | 5.2 | 17.8 | 27.6 | 1.26 | 3.0 | 2.7 | 1.9 | 40.7 |
| 3 | 6.9 | 27.6 | 37.9 | 1.12 | 6.9 | 1.7 | 1.5 | 317.6 |
| 4 | 8.6 | 23.2 | 48.3 | 1.71 | 4.2 | 2.2 | 1.0 | 145.5 |
| 5 | 9.6 | 36.5 | 48.3 | 1.06 | 3.75 | 1.25 | 0.95 | 224.0 |
| 6 | 8.7 | 36.5 | 51.3 | 1.17 | 3.05 | 0.9 | 0.66 | 265.6 |
| 7 | 9.0 | 36.1 | 49.5 | 1.12 | 3.7 | 1.5 | 1.0 | 180.0 |
| 8 | 6.7 | 28.0 | 38.3 | 1.13 | 4.2 | 2.6 | 1.5 | 103.8 |
| 9 | 9.3 | 35.2 | 47.7 | 1.09 | 4.0 | 1.5 | 1.0 | 200.0 |
| 10 | 8.8 | 35.6 | 50.1 | 1.16 | 2.7 | 1.2 | 0.9 | 150.0 |
| 11 | 9.2 | 39.4 | 60.2 | 1.29 | 1.4 | 1.3 | 1.0 | 30.8 |
| 12 | 5.8 | 19.2 | 29.0 | 1.21 | 2.2 | 1.3 | 0.9 | 100.0 |

FIG. 1 shows a graph of several examples from Tables 2A and 2B above, where the encapsulate sizes at d5, d50, and d90 are graphed against the respective Fracture Strengths. As shown on the graph of FIG. 1 and in Table 2B above, comparative Example 1A shows a J-type curve, where the Fracture Strength at d5 is relatively higher that the Fracture Strengths at d50 and d90. For example, for the encapsulates of Example 1A, the Fracture Strength at d5 is 14.2 MPa, and at d90, it is 1.1 MPa, an absolute difference of 13.1 MPa.

On the other hand, Examples 2, 4 and 10 according to the present disclosure show curves that are relatively flat compared to comparative Example 1A. This indicates that the differences in Fracture Strengths across the size distribution for the inventive populations are relatively small. For example, for the encapsulates of Example 2, the Fracture Strength at d5 is 3.0 MPa, and at d90, it is 1.9 MPa, an absolute difference of only 1.2 MPa.

As discussed above, it is believed that the small differences will lead to improved performance, for example by providing relatively consistent performance across encapsulate sizes.

Example 3. Performance Data

To compare encapsulates having different core:shell ratios and different sizes, four different populations of encapsulates are provided. The encapsulates of each population include the same materials for their respective wall polymers, primarily CN975 monomer.

The same perfume is used in each encapsulate type, and each core also include approximately 40 wt % of partitioning modifier (i.e., isopropyl myristate). The particles are added in respective amounts to provide 0.158 wt % of perfume, by weight of the fabric enhancer product composition.

Below, Table 3A provides more information on the tested encapsulates. Capsule types 1 and 3 are comparative examples (marked with an asterix "*"), having core:wall ratios outside the scope of the present disclosure. Table 3A also indicates which exemplary population of Example 2 (see above) each capsule type most closely approximates, which includes characteristics relating to Broadness Index.

TABLE 3A

| Capsule (*= comparative) | Core:Wall Wt. Ratio | Target Particle Size (microns) | Parallel to Sample [ ] from Example 2 above |
|---|---|---|---|
| 1* | 90:10 | 18 μm | Ex. 1A |
| 2 | 98:2 | 18 μm | Ex. 12 |
| 3* | 90:10 | 36 μm | Ex. 1B |
| 4 | 98:2 | 36 μm | Ex. 10 |

Samples of liquid fabric enhancers (with 7 wt % ester quat as softening active) are prepared with the four different populations of encapsulates.

Four different fabric types are treated (in combination with a mixed fabric load) with the fabric enhancers in a short cotton cycle in an automatic washing machine (1200 rpm), with the fabric enhancer being added during the last rinse cycle. The fabrics are described in Table 3B.

TABLE 3B

| Fabric | Fabric Description |
|---|---|
| A | 100% Cotton (ITL cotton terry swatches, ex Calderon Mill, Indianapolis, USA) |
| B | 100% Cotton (Muslin cotton swatches, ex Bamatex, Zulte, Belgium) |
| C | 100% Polyester (ex Maison Doree, Brussels, Belgium) |
| D | Synthetic blend (38% Polyester, 31% Acrylic, 21% Rayon, 10% Spandex; HEAT TECH ™ shirt, ex. Uniqlo, Brussels, Belgium) |

After the fabrics have been treated, expert perfumers perform an olfactive assessment for perfume intensity at the RUB, DRY, and WET touchpoints, and the scores at each touchpoint are averaged to give a score for that touchpoint. Scores are based on a perfume odor intensity scale from 0 to 100, where 0=no perfume odor, 25=slight perfume odor, 50=moderate perfume odor, 75=strong perfume odor, and 100=extremely strong perfume odor. Additionally, headspace data is collected above the treated fabric at each touchpoint using a solid phase microextraction (SPME) headspace approach with gas chromatography mass spectrometry (GCMS).

Results are provided in Table 3C (olfactory results) and Table 3D (headspace results). In addition, the average score or value for a given capsule on a given fabric across the three touchpoints is provided ("TOUCH PT. AVG."), the average score for a given capsule on a given fabric across the four fabric types is provided ("Average across fabrics"), and the difference between the highest value and the lowest value across the fabric types for any given capsule type and touchpoint is provided ("Delta across fabrics (high-low)").

TABLE 3C

| | | Avg. Olfactive Score at Indicated Touchpoint | | | |
|---|---|---|---|---|---|
| Fabric Type | Capsule Type | RUB | DRY | WET | TOUCH PT. AVG. |
| A (cotton terries) | 1* | 58.8 | 52.5 | 50 | 53.8 |
| | 2 | 61.3 | 55 | 47.5 | 54.6 |
| | 3* | 56.3 | 50 | 55 | 53.8 |
| | 4 | 70 | 62.5 | 46.3 | 59.6 |
| B (muslin cotton) | 1* | 55 | 50 | 47.5 | 50.8 |
| | 2 | 56.3 | 52.5 | 45 | 51.3 |
| | 3* | 50 | 47.5 | 52.5 | 50.0 |
| | 4 | 67.5 | 60 | 45 | 57.5 |
| C (polyester) | 1* | 60 | 55 | 55 | 56.7 |
| | 2 | 67.5 | 60 | 52.5 | 60.0 |
| | 3* | 52.5 | 47.5 | 60 | 53.3 |
| | 4 | 77.5 | 67.5 | 52.5 | 65.8 |
| D (synthetic blend) | 1* | 47.5 | 45 | 42.5 | 45.0 |
| | 2 | 58.8 | 55 | 42.5 | 52.1 |
| | 3* | 47.5 | 45 | 47.5 | 46.7 |
| | 4 | 60 | 55 | 42.5 | 52.5 |
| Average across fabrics | 1* | 55.3 | 50.6 | 48.8 | |
| | 2 | 61.0 | 55.6 | 46.9 | |
| | 3* | 51.6 | 47.5 | 53.8 | |
| | 4 | 68.8 | 61.3 | 46.6 | |
| Delta across fabrics (high-low) | 1* | 12.5 | 10 | 12.5 | |
| | 2 | 11.2 | 7.5 | 10 | |
| | 3* | 8.8 | 5 | 12.5 | |
| | 4 | 17.5 | 12.5 | 10 | |

*comparative examples

TABLE 3D

| | | Headspace Results at Indicated Touchpoint (nMol/L) | | | |
|---|---|---|---|---|---|
| Fabric Type | Capsule Type | RUB | DRY | WET | TOUCHPT. AVG. |
| A (cotton terries) | 1* | 115 | 59 | 74 | 82.7 |
| | 2 | 102 | 68 | 89 | 86.3 |
| | 3* | 69 | 49 | 91 | 69.7 |
| | 4 | 138 | 116 | 84 | 112.7 |
| B (muslin cotton) | 1* | 67 | 35 | 44 | 48.7 |
| | 2 | 45 | 27 | 49 | 40.3 |
| | 3* | 35 | 35 | 49 | 39.7 |
| | 4 | 59 | 32 | 44 | 45.0 |
| C (polyester) | 1* | 152 | 95 | 136 | 127.7 |
| | 2 | 88 | 68 | 44 | 66.7 |
| | 3* | 175 | 97 | 251 | 174.3 |
| | 4 | 230 | 73 | 123 | 142.0 |
| D (synthetic blend) | 1* | 16 | 6 | 50 | 24.0 |
| | 2 | 28 | 14 | 48 | 30.0 |
| | 3* | 11 | 7 | 106 | 41.3 |
| | 4 | 25 | 12 | 71 | 36.0 |
| Average across fabrics | 1* | 87.5 | 48.8 | 76.0 | |
| | 2 | 65.8 | 44.3 | 57.5 | |
| | 3* | 72.5 | 47 | 124.3 | |
| | 4 | 113 | 58.3 | 80.5 | |
| Delta across fabrics (high-low) | 1* | 136 | 89 | 92 | |
| | 2 | 74 | 54 | 45 | |
| | 3* | 164 | 90 | 202 | |
| | 4 | 205 | 104 | 79 | |

*comparative examples

According to the results provided in Tables 3C and 3D, encapsulates according to the present disclosure tend to perform better at the RUB and DRY touchpoints when compared to comparative encapsulates of the same size, particularly in the Olfactive tests (compare RUB and DRY scores for Capsules 2 vs. 1*, and 4 vs. 3*)

Additionally, encapsulates according to the present disclosure appear to provide higher olfactive/perfume intensity scores across the three touchpoints for any given fabric when compared to comparative encapsulates of the same size (compare TOUCHPT. AVG. for Capsules 2 vs. 1*, and 4 vs. 3*).

The data also shows that while both Capsules 2 and 4 (encapsulates according to the present disclosure) perform well, the larger encapsulates (e.g., 36 μm) tend to preferable to the smaller encapsulates (18 μm), particularly in Olfactive tests at the DRY and RUB touchpoints.

Furthermore, even though the olfactive and headspace values tend to be relatively lower for the inventive capsules compared to comparative capsules of the same size at the WET touchpoint, the difference in the high and low value (e.g., "Delta across fabrics") is, more often than not, relatively lower for encapsulates according to the present disclosure. See, e.g., "Delta across fabrics" at the WET touchpoint for Capsules 2 vs. 1*(45 vs. 92), and 4 vs. 3*(79 vs. 202). The lower delta values indicate that that the WET performance for capsules according to the present disclosure is relatively more consistent across fabric types than for the comparative capsules.

Example 4. Exemplary Formulations—Liquid Fabric Enhancers

Table 4 shows exemplary formulations of compositions according to the present disclosure. Specifically, the following compositions are liquid fabric enhancer products.

TABLE 4

| | % Active (w/w) | | |
|---|---|---|---|
| Ingredient | Composition 1 | Composition 2 | Composition 3 |
| Quaternary ammonium ester material | 5% (Ester Quat 1)[1] | 7% (Ester Quat 2)[2] | 8% (Ester Quat 3)[3] |
| Delivery Particles* (w/ encapsulated fragrance) | 0.25% | 0.25% | 0.25% |
| Formic Acid | 0.045% | 0.045% | 0% |
| Hydrochloric acid | 0.01% | 0% | 0% |
| Preservative | 0.0045% | 0% | 0% |
| Chelant | 0.0071% | 0.0071% | 0% |
| Structurant | 0.10% | 0.30% | 0.1% |
| Antifoam | 0.008% | 0.00% | 0% |
| Water | Balance | Balance | Balance |

[1]Ester Quat 1: Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20 M Conc, ex Evonik)

[2]Ester Quat 2: N,N-bis(hydroxyethyl)-N,N-dimethyl ammonium chloride fatty acid ester, produced from C12-C18 fatty acid mixture (REWOQUAT CI-DEEDMAC, ex Evonik)

[3]Ester Quat 3: Esterification product of fatty acids (C16-18 and C18 unsaturated) with triethanolamine, quaternized with dimethyl sulphate (REWOQUAT WE 18, ex Evonik)

*Delivery particles according to the present disclosure, e.g., the population formed in Example 1 above. The "% Active" provided is the amount of fragrance delivered to the composition.

Example 5. Exemplary Formulations—Laundry Additive Particles

Table 5 shows exemplary formulations of compositions according to the present disclosure. Specifically, the following compositions are laundry additive particles in the form of a pastille or "bead," similar in form to those sold as DOWNY UNSTOPABLES (ex The Procter & Gamble Co.).

TABLE 5

| Ingredient | Ex. 1 | Ex. 2 | Ex. 3 | Ex. 4 | Ex. 5 | Ex. 6 |
|---|---|---|---|---|---|---|
| Polyethylene Glycol MW 8000 [1] | 64% | 65% | 63% | 83.5% | 81.5% | 61% |
| Ester Quat [2] | 25% | 27% | 25% | — | — | 24% |
| CatHEC [3] | 3% | 3% | — | — | — | — |
| Perfume | — | — | — | 10.3% | 13.3% | 5% |
| Delivery Particles Slurry [4] | 8% | 4% | 12% | 5% | 5.2% | 10% |

[1] PLURIOL E8000 (ex BASF)

[2] Esterification product of fatty acids (C16-18 and C18 unsaturated) with triethanolamine, quaternized with dimethyl sulphate (REWOQUAT WE 18, ex Evonik)

[3] Cationically-modified hydroxyethylcellulose

[4] Fragrance delivery particles according to the present disclosure, e.g., the population formed in Example 1 above. The % provided is the amount of aqueous slurry provided to the composition, where the slurry comprises about 45 wt % of delivery particles (core + shell).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer product composition comprising a treatment adjunct and a population of encapsulates, wherein the encapsulates comprise a core and a shell surrounding the core, wherein the shell comprises an acrylate material, wherein the core comprises a benefit agent, wherein the core and the shell are present in a core:shell weight ratio of at least about 98:2 for the population, wherein the population of encapsulates is characterized by a Broadness Index of at least 1.0, and a Delta Fracture Strength of less than 400%, and wherein the population of encapsulates comprises a median volume-weighted particle size of from about 25 microns to about 50 microns.

2. The consumer product composition according to claim 1, wherein the population of encapsulates comprises:

first encapsulates at the $5^{th}$ percentile volume-weighted particle size, wherein the first encapsulates are characterized by a first average Fracture Strength;

second encapsulates at the $90^{th}$ percentile volume-weighted particle size, wherein the second encapsulates are characterized by a second average Fracture Strength;

wherein at least one of the following is true:

i) the first and second average Fracture Strengths are each and independently from about 0.5 to about 10 MPa; and/or ii) the difference between the first and second average Fracture Strengths is less than 10 MPa.

3. The consumer product composition according to claim 1, wherein the acrylate material comprises a (meth)acrylate polymer derived from a multifunctional (meth)acrylate monomer or oligomer having at least three radical polymerizable functional groups, with the proviso that at least one of the radical polymerizable groups is acrylate or methacrylate.

4. The consumer product composition according to claim 1, wherein the multifunctional (meth)acrylate monomer or oligomer has at least four radical polymerizable functional groups.

5. The consumer product composition according to claim 1, wherein the multifunctional (meth)acrylate monomer or oligomer comprises a multifunctional aromatic urethane acrylate.

6. The consumer product composition according to claim 1, wherein the acrylate material is derived from at least two different monomers or oligomers.

7. The consumer product composition according to claim 1, wherein the acrylate material is further derived, at least in part, from at least one free radical initiator, wherein the at least one free radical initiator is present in amount of from about 2% to about 50% by weight of the shell.

8. The consumer product composition according to claim 1, wherein the core and the shell are present in a core:shell weight ratio of from about 98:2 to about 99.5:0.5.

9. The consumer product composition according to claim 1, wherein the population of encapsulates is characterized by a Broadness Index of at least 1.1.

10. The consumer product composition according to claim 1, wherein the population of encapsulates is characterized by a Delta Fracture Strength of less than or equal to 200%.

11. The consumer product composition according to claim 1, wherein the population of encapsulates is further characterized by:

the 5th-percentile volume-weighted particle size is from about 1 micron to about 15 microns; or the 90th-percentile volume-weighted particle size is from about 20 microns to about 65 microns.

12. The consumer product composition according to claim 1, wherein the population of encapsulates is further characterized by:

the 5th-percentile volume-weighted particle size is from about 1 micron to about 15 microns;

and the 90th-percentile volume-weighted particle size is from about 20 microns to about 65 microns.

13. The consumer product composition according to claim 1, wherein the core further comprises a partitioning modifier, wherein said partitioning modifier comprising a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof.

14. The consumer product composition according to claim 1, wherein the shell of the encapsulates further comprises a coating material.

15. The consumer product composition according to claim 1, wherein the population of encapsulates recited in claim 1 is a first population of encapsulates, wherein the composition further comprises a second population of encapsulates, wherein the encapsulates of the second population comprise a core and a shell surrounding the core, wherein the core comprises a benefit agent, wherein the encapsulates of the second population are characterized by one or more of the following, compared to the first population of encapsulates:

a different core composition, a different benefit agent, a different shell, a different core:shell weight ratio, a different volume-weighted median particle size, a different 5th-percentile volume-weighted particle size, a different 90th-percentile volume-weighted particle size, a different Broadness Index, a different Delta Fracture Strength, a different average Fracture Strength for particles at the 5th-percentile volume-weighted particle size, a different average Fracture Strength for particles at the $90^{th}$ percentile volume-weighted particle size, or combinations thereof.

16. The consumer product composition according to claim 1, wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

17. The consumer product composition according to claim 1, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

18. A method of treating a fabric load, wherein the method comprises contacting the fabric load with a treatment liquor, wherein the treatment liquor comprises the composition according to claim 1 diluted with water.

19. The method according claim 18, wherein the fabric load comprises a first fabric material that is 100% cotton and a second fabric material that is not 100% cotton.

20. The method according to claim 18, wherein the fabric load comprises at least two types of fabric materials, wherein a first fabric material is part of a first article or first garment, and wherein a second fabric material is part of a second article or second garment.

* * * * *